United States Patent
Zeng et al.

(10) Patent No.: US 8,711,912 B2
(45) Date of Patent: Apr. 29, 2014

(54) METHOD, DEVICE AND COMPUTER READABLE MEDIUM FOR DETERMINING WHETHER TRANSMISSION SIGNALS ARE PRESENT IN RECEIVED SIGNALS

(75) Inventors: Yonghong Zeng, Singapore (SG); Ser Wah Oh, Singapore (SG); Ronghong Mo, Singapore (SG)

(73) Assignee: Agency for Science, Technology and Research, Matrix (SG)

( * ) Notice: Subject to any disclaimer, the term of this patent is extended or adjusted under 35 U.S.C. 154(b) by 334 days.

(21) Appl. No.: 13/002,328

(22) PCT Filed: Jun. 9, 2009

(86) PCT No.: PCT/SG2009/000204
§ 371 (c)(1),
(2), (4) Date: Apr. 20, 2011

(87) PCT Pub. No.: WO2010/005396
PCT Pub. Date: Jan. 14, 2010

(65) Prior Publication Data
US 2011/0188557 A1  Aug. 4, 2011

Related U.S. Application Data

(60) Provisional application No. 61/079,531, filed on Jul. 10, 2008.

(51) Int. Cl.
*H04B 17/00*   (2006.01)

(52) U.S. Cl.
USPC ........... 375/224; 375/219; 375/316; 370/230; 370/210

(58) Field of Classification Search
USPC ................ 375/224, 219, 316; 370/230, 210
See application file for complete search history.

(56) References Cited

U.S. PATENT DOCUMENTS

| 5,801,759 | A | * | 9/1998 | Limberg | 348/21 |
| 6,034,952 | A | * | 3/2000 | Dohi et al. | 370/335 |
| 6,879,649 | B1 | | 4/2005 | Radimirsch et al. | |

(Continued)

FOREIGN PATENT DOCUMENTS

| CN | 101102603 A | 1/2008 |
| JP | 4054039 B2 | 2/2008 |

OTHER PUBLICATIONS

Esmailian, T., et al., "In-building power lines as high-speed communication channels: channel characterization and a test channel ensemble", "International Journal of Communication Systems", 2003, pp. 381-400, vol. 16.

(Continued)

*Primary Examiner* — Kenneth Lam
(74) *Attorney, Agent, or Firm* — Hultquist, PLLC; Steven J. Hultquist; Mary B. Grant

(57) ABSTRACT

A method is provided for determining whether transmission signals are present in received signals, the method comprising: receiving a first signal via a first radio resource; receiving a second signal via a second radio resource; determining whether a first transmission signal is present in the received first signal based on the received second signal; and determining whether a second transmission signal is present in the received second signal based on the received first signal.

18 Claims, 17 Drawing Sheets

(56) References Cited

U.S. PATENT DOCUMENTS

| | | |
|---|---|---|
| 7,545,781 B2 | 6/2009 | Otsuki et al. |
| 7,860,197 B2* | 12/2010 | Hur et al. ............... 375/344 |
| 8,275,323 B1* | 9/2012 | Shirali et al. ............ 455/67.11 |
| 8,340,060 B2* | 12/2012 | Sahin et al. ............. 370/338 |
| 2004/0048619 A1* | 3/2004 | Kim et al. .............. 455/452.1 |
| 2005/0265434 A1 | 12/2005 | Watanabe |
| 2006/0209746 A1 | 9/2006 | Asai et al. |
| 2007/0091720 A1 | 4/2007 | Woo et al. |
| 2008/0008229 A1 | 1/2008 | Hamabe et al. |
| 2008/0160927 A1* | 7/2008 | Bar-Ness et al. ........... 455/73 |
| 2008/0165680 A1* | 7/2008 | Chang ................... 370/230 |
| 2009/0135713 A1* | 5/2009 | Hwang et al. ............ 370/210 |
| 2009/0197627 A1* | 8/2009 | Kuffner et al. ........... 455/522 |
| 2009/0221295 A1* | 9/2009 | Sahin et al. ............. 455/450 |
| 2010/0172427 A1* | 7/2010 | Kleider et al. ........... 375/260 |

OTHER PUBLICATIONS

Sonnenschein, A., et al., "Radiometric Detection of Spread-Spectrum Signals in Noise of Uncertain Power", "IEEE Transactions on Aerospace and Electronic Systems", 1992, pp. 654-660, vol. 28, No. 3.

Wax, M., et al., "Detection of Signals by Information Theoretic Criteria", "IEEE Transactions on Acoustics, Speech, and Signal Processing", 1985, pp. 387-392, vol. 33, No. 2.

Weiss, T.A., et al., "Spectrum Pooling: An Innovative Strategy for the Enhancement of Spectrum Efficiency", "IEEE Radio Communications", 2004, pp. S8-S14.

Zeng, Y., et al., "Maximum-Minimum Eigenvalue Detection for Cognitive Radio", "The 18th Annual IEEE International Symposium on Personal, Indoor and Mobile Radio Communications (PIMRC'07), Athens, Greece", Sep. 3-7, 2007, pp. 1-5.

\* cited by examiner

METHOD, DEVICE AND COMPUTER READABLE MEDIUM FOR DETERMINING WHETHER TRANSMISSION SIGNALS ARE PRESENT IN RECEIVED SIGNALS

CROSS-REFERENCE TO RELATED APPLICATIONS

The present application is a U.S. national phase application under the provisions of 35 U.S.C. §371 of International Patent Application No. PCT/SG09/00204 (filed on Jun. 9, 2009), which in turn claims the benefit of U.S. provisional patent application No. 61/079,531 (filed on Jul. 10, 2008). The entire contents of such international patent application and U.S. provisional patent application are hereby incorporated by reference herein in their respective entireties, for all purposes.

TECHNICAL FIELD

Embodiments of the invention generally relate to a method for determining whether transmission signals are present in received signals.

BACKGROUND

Orthogonal frequency division multiple access (OFDMA), in which the subcarriers in an orthogonal frequency division multiplexing (OFDM) symbol are assigned to different communication devices for simultaneous transmission, has been proposed as a new physical layer multiple access technique and adopted by some wireless application standards such as the wireless metropolitan area network (MAN) standard (IEEE 802.16). In a non-centralized network, communication devices are not aware which subcarriers have been occupied by other communication devices in the network. Therefore, before using the shared channel, each communication device must sense the channel to see which subcarriers are occupied. This is called subcarrier sensing. Subcarrier sensing is different from the conventional sensing, which senses the availability of the whole channel. In conventional carrier sense multiple access (CSMA), a communication device senses the whole channel and uses the whole channel if it is not occupied by others. Subcarrier sensing allows multiple communication devices to share the same channel and therefore increases the channel capacity by allowing opportunistic usage. This is also called OFDM based spectrum pooling (cf. [1]), a type of cognitive radio system. Cognitive radio is a paradigm for wireless communication in which either a network or a wireless communication device changes its transmission or reception parameters to communicate efficiently avoiding interference with licensed or unlicensed communication devices. This alteration of parameters is generally based on the active monitoring of several factors in the external and internal radio environment, such as radio frequency spectrum, communication device behavior and network state.

It is desired to provide a method to sense the availability of each of the subcarriers. In other words, it is desired to provide a method to determine whether the transmission signals are present in received signals via at least one subcarrier.

SUMMARY

In one embodiment, a method is provided for determining whether transmission signals are present in received signals, the method including receiving a first signal via a first radio resource; receiving a second signal via a second radio resource; determining whether a first transmission signal is present in the received first signal based on the received second signal; and determining whether a second transmission signal is present in the received second signal based on the received first signal.

According to other embodiments, a device and a computer readable medium according to the method described above are provided.

It should also be noted that the embodiments described in the dependent claims of the independent method claim are also analogously valid for the corresponding device and computer readable medium where applicable.

BRIEF DESCRIPTION OF THE DRAWINGS

The drawings are not necessarily to scale, emphasis instead generally being placed upon illustrating the principles of various embodiments. In the following description, various embodiments are described with reference to the following drawings, in which.

DESCRIPTION

Figure 1:
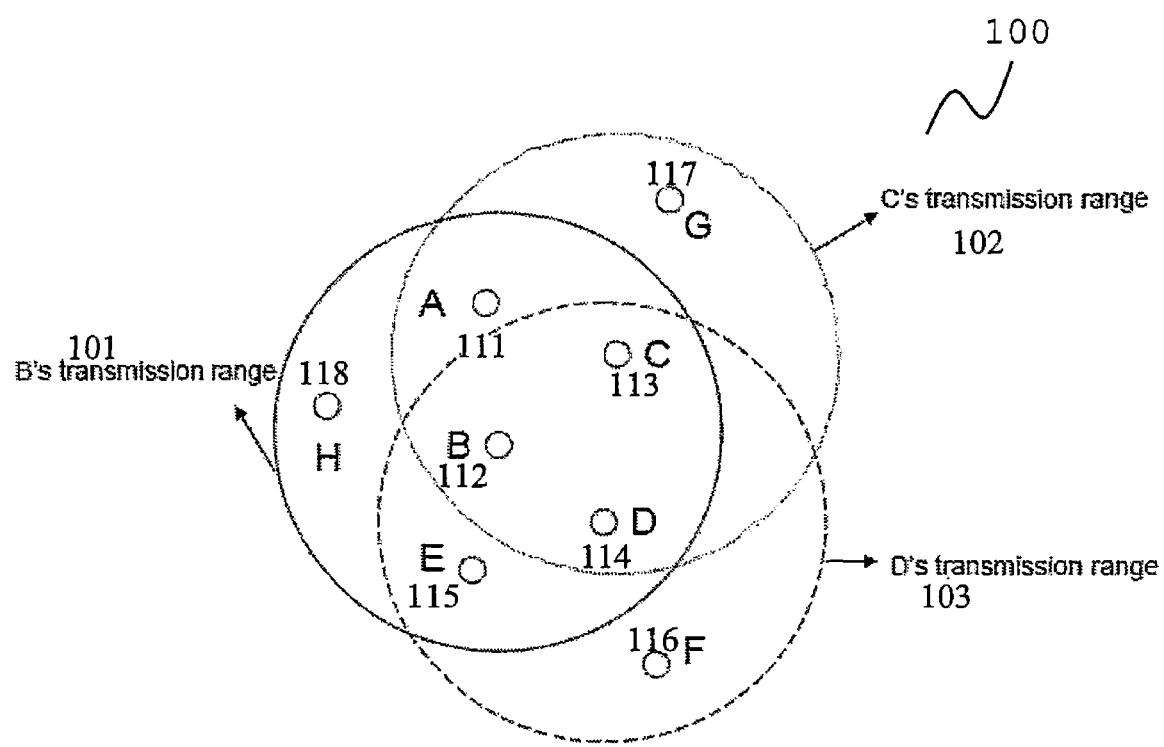
FIG. 1 illustrates a communication network according to one embodiment.

FIG. 1 illustrates a communication network 100 according to one embodiment. The communication network 100 includes communication devices A to H (111-118), wherein all the communication devices A to H (111-118) may work in a particular frequency channel. For illustration, circle line 101 represents the transmission range of communication device B 112, meaning that communication device B is able to transmit OFDM symbols to other devices that are located within the circle line 101. In this illustration, communication device B 112 is able to transmit orthogonal frequency division multiplexing (OFDM) symbols to devices A 111, C 113, D 114, E 115, and H 118. Similarly, circle line 102 represents the transmission range of device C 113, meaning that device C is able to transmit OFDM symbols to other devices that are located within the circle line 102, and circle line 103 represents the transmission range of device D 114, meaning that device D is able to transmit OFDM symbols to other devices that are located within the circle line 103.

In one embodiment, it may be assumed that in the network 100, every communication device of communication devices A 111-H 118 knows the orthogonal frequency division multiplexing (OFDM) structure, that is, the cyclic prefix (CP) length and the Fast Fourier Transform (FFT) size. When a communication device receives a signal, the communication device discards the part corresponding to the CP and then implements a FFT on the signal. Two hypotheses may be used:

$H_0$, signal/interference absent on a subcarrier; and
$H_1$, signal/interference present on a subcarrier.

The received signal on subcarrier n (n=0; 1; ...; N−1) may be written as $$H_0: x_i(n) = \eta_i(n), i=0,1,\ldots,M-1 \qquad (1)$$

$$H_1: x_i(n) = s_i(n) + \eta_i(n), i=0,1,\ldots,M-1 \qquad (2)$$

where i is the OFDM symbol index, $\eta_i(n)$ is the noise and $s_i(n)$ is the signal or interference component on subcarrier n. Here interference may be treated as signal in order to avoid using the subcarrier with strong interference. The $x_i(n)$ may refer to constellation symbols after FFT has been performed on the OFDM symbol stream received in the time domain. For example, $x_i(0) \ldots x_i(N-1)$ is generated by FFT from the ith OFDM symbol that has been received. It may be assumed that a number of M OFDM symbols are received. It may also be assumed that
(1) $\eta_i(n)$ are independent and identically distributed;
(2) $s_i(n)$ are independent at different time i and subcarrier n. In other words, $s_i(n)$ are independent in different OFDM symbols and subcarrier n.

In one embodiment, the communication devices A 111-H 118 carry out a detection which is to find all the subcarriers being occupied by other communication devices or interference based on the received signal $x_i(n)$. If the received signal $x_i(n)$ comprises a transmission signal $s_i(n)$, then the respective subcarrier n is occupied.

It should be noted that the method of sensing transmission signals in subcarriers provided herewith is also applicable to multi-channel sensing. That is, sensing multiple channels to identify which channel is occupied or vacant. For multi-channel sensing, $s_i(n)$ and $\eta_i(n)$ as appeared in equations (1) and (2) may represent the signal and noise, respectively, on channel n and time i.

Figure 2:
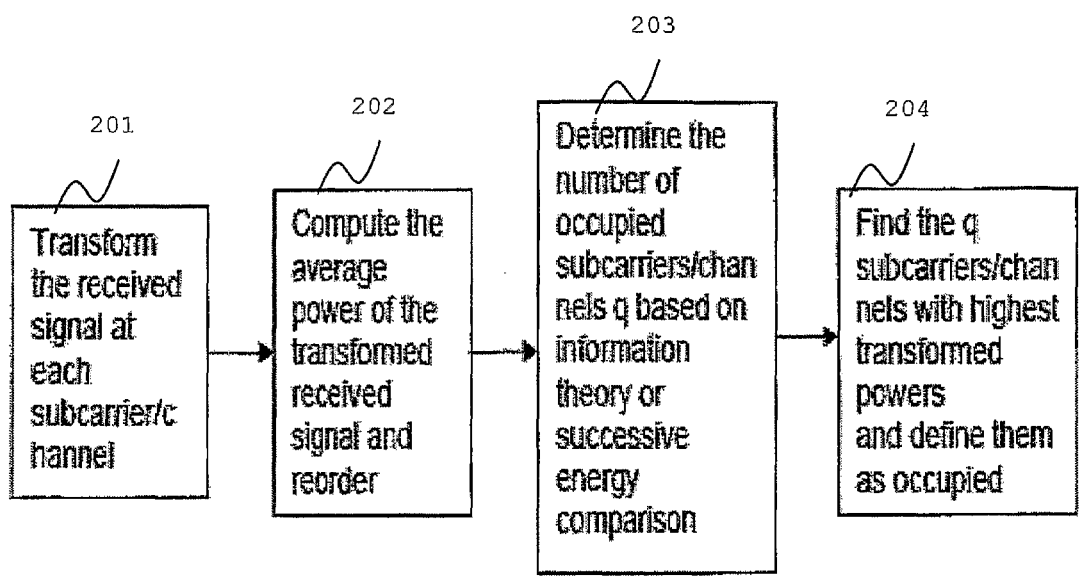
FIG. 2 illustrates a method of OFDMA subcarrier sensing or multiple channel sensing according to one embodiment.

FIG. 2 illustrates the method of OFDMA subcarrier sensing or multiple channel sensing according to one embodiment. The method includes 201-204.

In 201, the received signal $x_i(n)$ at each subcarrier or each channel is transformed into $\hat{x}_i(n)$. That is, $\hat{x}_i(n) = \phi(x_i(n))$, where $\phi$ is a function. The function $\phi$ may be chosen based on the transmitted source signal $s_i(n)$.

In 202, the average power of the transformed received signal $\hat{x}_i(n)$ may be computed:

$$y(n) = \frac{1}{M}\sum_{i=0}^{M-1}|\hat{x}_i(n)|^2, n=0,\ldots,N-1.$$

The sequence of y(n) may be reordered into $y_1(n)$ with descending or ascending order.

In 203, the number of vacant/occupied subcarriers/channels may be determined based on information theory or successive energy comparison. If the number of vacant subcarriers/channels is found as p, then the number of occupied subcarriers/channels is q=N−p.

In 204, the q subcarriers/channels with highest transformed powers are found and may be defined as occupied subcarriers/channels.

Figure 3:
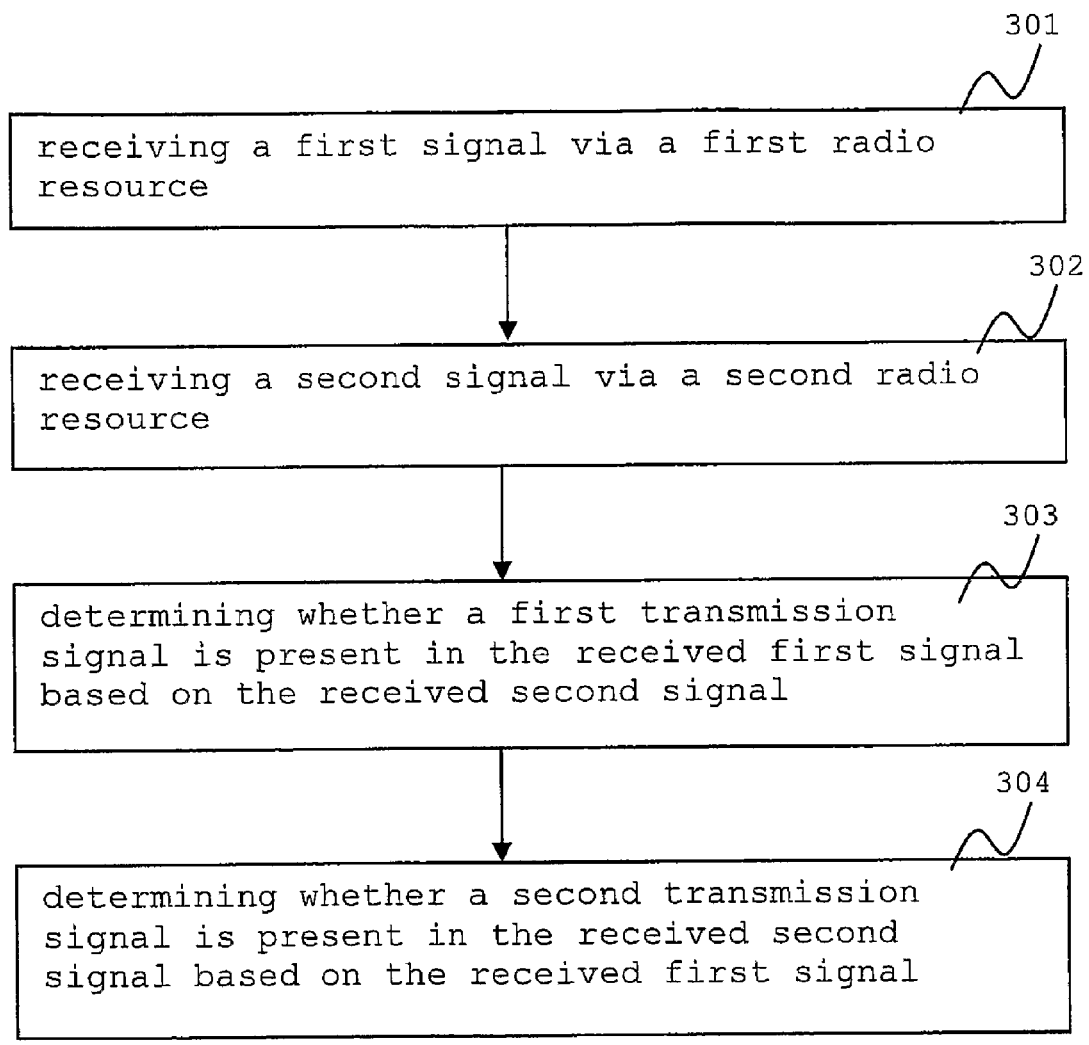
FIG. 3 illustrates a method of determining whether transmission signals are present in received signals according to one embodiment.

FIG. 3 illustrates a method for determining whether transmission signals are present in received signals according to one embodiment. In this context, interference signals are also considered as transmission signals. The method illustrated in FIG. 3 includes 301-304.

In one embodiment, in 301, a first signal is received via a first radio resource. For example, the first signal may be referred to signal received via a first subcarrier, or via a first frequency range. Assuming that there are a number of N subcarriers (n=0, 1, ..., N−1) for the OFDM symbol transmission, and a number of M OFDM symbols (i=0, 1, ..., M−1) are received, the first received signal may be a signal received via subcarrier n=0, namely, signal $x_i(0)$ wherein i=0, 1, ..., M−1.

In one embodiment, the first radio resource is at least one first carrier signal. For example, the first signal is received via at least one subcarrier, i.e. the subcarrier with subcarrier number n=0 and comprises a plurality of for example M signal values $x_i(0)$ (for i=0, 1, ..., M−1).

In one embodiment, the first radio resource is a first frequency range. In one embodiment, the first radio resource is a first communication channel.

In one embodiment, in 302, a second signal is received via a second radio resource. For example, the second received signal may be a signal received via subcarrier n=1, namely, the signal with signal values $x_i(1)$ with i=0, 1, ..., M−1. For another example, if the first signal value of the first received signal $x_0(0)$ is received via subcarrier n=0, the first signal value of the second received signal $x_0(1)$ may correspond to the same OFDM symbol and correspond to another subcarrier n=1.

In one embodiment, the second radio resource is at least one second carrier signal. In one embodiment, the second radio resource is a second frequency range. In one embodiment, the second radio resource is a second communication channel.

In one embodiment, the first signal and the second signal are, at least partially, received simultaneously. For example, the first signal value of the first signal is $x_0(0)$, and the first signal value of the second signal is $x_0(1)$. Then the first signal value of the first signal and the first signal value of the second signal may correspond to the same OFDM symbol i=0 and may thus be received simultaneously.

In one embodiment, in 303, it is determined whether a first transmission signal is present in the received first signal based on the received second signal. For example, the received first signal may be $x_i(0)$ wherein i=0, 1, ..., M−1, and the received second signal may be $x_i(1)$ wherein i=0, 1, ..., M−1. Referring to 201 as illustrated in FIG. 2, the received first signal $x_i(0)$ at subcarrier n=0 is transformed into $\hat{x}_i(0)$, and the received second signal $x_i(1)$ at subcarrier n=1 is transformed into $\hat{x}_i(1)$. Referring to 202 as illustrated in FIG. 2, an average power of the transformed received first signal $\hat{x}_i(0)$ may be computed using equation:

$$y(0) = \frac{1}{M}\sum_{i=0}^{M-1} |\hat{x}_i(0)|^2.$$

Similarly, an average power of the transformed received second signal $\hat{x}_i(1)$ may be computed using equation $$y(1) = \frac{1}{M}\sum_{i=0}^{M-1} |\hat{x}_i(1)|^2 \cdot y(n)$$

may be reordered into $y_1(n)$, i.e., in a descending order. For example, assuming that N=2 and thus there are only two subcarriers n=0 and n=1, then if $y(0)>y(1)$, $y_1(n)$ is ordered to be $y(0)$, $y(1)$. Similarly, for any value of M, assuming that $y(0)>y(1)> \ldots >y(N-1)$, then $y_1(n)$ is ordered to be $y(0)$, $y(1)$, ... $y(N-1)$. In other words, for any value of M, $y_1(n)$ is ordered such that $y_1(0)>y_1(1)> \ldots >y_1(N-1)$. In one example, if $y(0)$ is much larger than $y(1)$, it may be concluded that there is transmission signal $s_i(0)$ being present in the received first signal $x_i(0)$. In a further example, referring to 203 as illustrated in FIG. 2, the number of occupied subcarrier q may be determined based on information theory or successive energy comparison. In this context, the term occupied subcarrier refers to a subcarrier that is used to transmit a transmission signal. For a particular example, q may be determined to be 1. Referring to 204 as illustrated in FIG. 2, based on the value of q=1, it may be determined that the one subcarrier with highest transformed power, namely the subcarrier corresponding to $y_1(0)$ in this example, is occupied. Thus, it may be concluded that the first transmission signal $s_i(0)$ is present in the received first signal $x_i(0)$, and no transmission signal is present in the second signal $x_i(1)$. Thus, in one embodiment, the determination of whether the transmission signal $s_i(0)$ is present in the first signal $x_i(0)$ is based on the second signal $x_i(1)$ and a comparison with the second signal $x_i(1)$.

In one embodiment, in 304, it is determined whether a second transmission signal is present in the received second signal based on the received first signal. As an illustration, the received first signal may be $x_i(0)$ wherein i=0, 1, ..., M−1, and the received second signal may be $x_i(1)$ wherein i=0, 1, ..., M−1. Referring to step 201 as illustrated in FIG. 2, the received first signal $x_i(0)$ at subcarrier n=0 is transformed into $\hat{x}_i(0)$, and the received second signal $x_i(1)$ at subcarrier n=1 is transformed into $\hat{x}_i(1)$. Referring to 202 as illustrated in FIG. 2, an average power of the transformed received signal $\hat{x}_i(0)$ may be computed using equation $$y(0) = \frac{1}{M}\sum_{i=0}^{M-1} |\hat{x}_i(0)|^2.$$

Similarly, an average power of the transformed received signal $\hat{x}_i(1)$ may be computed using equation $$y(1) = \frac{1}{M}\sum_{i=0}^{M-1} |\hat{x}_i(1)|^2 \cdot y(n)$$

may be reordered into $y_1(n)$, i.e., in a descending order. For example, assuming that $y(0)>y(1)> \ldots >y(N-1)$, then $y_1(n)$ is ordered to be $y(0)$, $y(1)$, ... $y(N-1)$. In other words, for any value of M, $y_1(n)$ is ordered such that $y_1(0)>y_1(1)> \ldots > y_1(N-1)$. In one example, if $y(0)$ is much larger than $y(1)$, it may be concluded that there is no transmission signal $s_i(1)$ in the received second signal $x_i(1)$. In another example, referring to 203 as illustrated in FIG. 2, the number of occupied subcarrier q may be determined based on information theory or successive energy comparison. For a particular example, q may be determined to be 1. Referring to 204 as illustrated in FIG. 2, based on the value of q=1, it may be determined that the one subcarrier with highest transformed power, namely subcarrier n=0 in this example, is occupied. Thus, it may be concluded that the first transmission signal $s_i(0)$ is present in the first signal $x_i(0)$, and no transmission signal is present in the second signal $x_i(1)$. Thus, in one embodiment, the determination of whether the transmission signal is present in the second signal $x_i(1)$ is based on the first signal $x_i(0)$ and a comparison with the first signal $x_i(0)$.

In one embodiment, in other words, the method of determining whether transmission signals are present in received signals includes receiving of a first signal and receiving of a second signal. For example, the first signal and the second signal may be of the same OFDM symbols but correspond to different subcarriers.

In one embodiment, the method further comprises determination of whether the first signal comprises a transmission signal. The determination may be based on the second signal. For example, the averaged power of the received first signal and the received second signal may be calculated, respectively. The comparison of the averaged powers may be used for further determination of whether the first signal comprises a first transmission signal. In a similar manner, it may be determined whether the second signal comprises a second transmission signal.

In one embodiment, it is determined whether the first transmission signal is present in the received first signal based on the received second signal and the received first signal. In other words, the determination is based on both the first signal and the second signal. The determination, for example, may be based on a comparison of the first signal and the second signal.

In one embodiment, determining whether a first transmission signal is present in the received first signal comprises determining a measure of the average power of the received second signal and wherein it is determined whether the first transmission signal is present in the received first signal based on the determined measure of the average power of the received second signal.

As an illustration, referring to 202 as illustrated in FIG. 2, the first signal may be $x_i(0)$ wherein i=0, 1, ..., M−1, and the second signal may be $x_i(1)$ wherein i=0, 1, ..., M−1. Referring to 201 as illustrated in FIG. 2, the received first signal $x_i(0)$ at subcarrier n=0 is transformed into $\hat{x}_i(0)$, and the received second signal $x_i(1)$ at subcarrier n=1 is transformed into $\hat{x}_i(1)$. Referring to 202 as illustrated in FIG. 2, an average power of the transformed received signal $\hat{x}_i(0)$ may be computed using equation $$y(0) = \frac{1}{M}\sum_{i=0}^{M-1} |\hat{x}_i(0)|^2,$$

and an average power of the transformed received signal $\hat{x}_i(1)$ may be computed using equation $$y(1) = \frac{1}{M} \sum_{i=0}^{M-1} |\hat{x}_i(1)|^2.$$

Based on the computed y(0) and y(1), it may be determined whether the first transmission signal $s_i(0)$ is present in the received first signal $x_i(0)$ based on the received second signal $x_i(1)$ and the received first signal $x_i(0)$. For example, if y(0) is much larger than y(1), it may be determined that signal $x_i(0)$ comprises a transmission signal $s_i(0)$.

In one embodiment, the received second signal comprises a plurality of signal values and the measure of the average power of the received second signal is determined based on a combination of the signal values. As an illustration, the second signal $x_i(1)$ wherein i=0, 1, . . . , M−1, which is the signal received via subcarrier n=1, comprises a plurality of signal values $x_0(1), x_1(1), \ldots, x_{M-1}(1)$, wherein a number of M constellation symbols (e.g. according to 4QAM, 64QAM, QPSK etc.) are received. The combination of the plurality of signal values may be used to determine the average power of the received second signal, i.e.

$$y(1) = \frac{1}{M} \sum_{i=0}^{M-1} |\hat{x}_i(1)|^2.$$

In one embodiment, for each signal value, a measure of the signal value based on the absolute value of the signal value is determined and the combination of the signal values is an average of the measures of the signal values. Taking the subcarrier n=1 as a particular example, referring to 201 as illustrated in FIG. 2, each signal value $x_i(1)$ wherein i=0, 1, . . . , M−1 is transformed into $\hat{x}_i(1)$, i.e. $x_0(1)$ is transformed into $\hat{x}_0(1)$. Then the absolute value of each transformed signal value is determined, i.e. the absolute value of $\hat{x}_0(1)$ is determined to be $|\hat{x}_0(1)|$. Further, referring to 202 as illustrated in FIG. 2 and the equation $$y(1) = \frac{1}{M} \sum_{i=0}^{M-1} |\hat{x}_i(1)|^2,$$

the signal values $\hat{x}_i(1)$ are combined in the measure of average power of received signal via subcarrier n=1 and an average is calculated to be y(1).

In one embodiment, the measure of the average power is determined based on an average of the squared absolute values of the signal values. This embodiment is illustrated in the equation $$y(1) = \frac{1}{M} \sum_{i=0}^{M-1} |\hat{x}_i(1)|^2.$$

In one embodiment, determining whether the first transmission signal is present in the received first signal further comprises determining a measure of the average power of the received first signal and it is determined whether the first transmission signal is present in the received first signal based on the determined measure of the average power of the received second signal and the measure of the determined average power of the received first signal. As an illustration, considering that the first signal is $x_i(0)$ wherein i=0, 1, . . . , M−1, and the second signal is $x_i(1)$ wherein i=0, 1, . . . , M−1, then the average powers y(0) and y(1) may be determined using equation $$y(n) = \frac{1}{M} \sum_{i=0}^{M-1} |\hat{x}_i(n)|^2, n = 0, \ldots, N-1,$$

respectively. The values of y(0) and y(1) are compared, and y(n) is reordered to be $y_1$(n), for example, with descending order. Based on the reordered $y_1$(n), it may be determined whether the first signal is $x_i(0)$ comprises a first transmission signal $s_i(0)$.

In one embodiment, it is determined whether the first transmission signal is present in the received first signal based on a comparison of the measure of the average power of the received first signal with the measure of the average power of the received second signal.

In one embodiment, the method of determining whether transmission signals are present in received signals further comprises receiving one or more third signals, wherein each of the one or more third signals is received via a respective third radio resource of one or more third radio resources; and determining, for each of the one or more third signals, whether a respective third transmission signal is present in the received third signal based on the received first signal. As an illustration, the first signal is $x_i(0)$ wherein i=0, 1, . . . , M−1, the second signal is $x_i(1)$ wherein i=0, 1, . . . , M−1, and the third signal may be $x_i(2)$ wherein i=0, 1, . . . , M−1. There may be more received signals $x_i(n)$ wherein n=2, . . . , N−1, wherein N is the number of subcarriers. For each received signal $x_i(n)$, it may be determined whether a transmission signal $s_i(n)$ is present in the respective received signal. The determination may be based on the first received signal $x_i(0)$, and further based on the received second signal $x_i(1)$. For example, based on each received signal $x_i(n)$ wherein n=0, 1, . . . , N−1, the average power y(n) may be determined using the equation $$y(n) = \frac{1}{M} \sum_{i=0}^{M-1} |\hat{x}_i(n)|^2, n = 0, \ldots, N-1.$$

The values of y(n) are compared and based on the comparison, y(n) is reordered into $y_1$(n), i.e. with descending order. For example, if y(0)>y(1)> . . . >y(N−1), then $y_1$(n) is reordered to be y(0), y(1), . . . , y(N−1). In other words, $y_1$(n) is ordered such that $y_1$(0)>$y_1$(1)> . . . >$y_1$(N−1). Based on the order of $y_1$(n), the number of occupied subcarriers q may be determined. Then the first q subcarriers with highest transformed average powers in $y_1$(n) are determined as being occupied. In other words, in this example, subcarriers n=0, 1, . . . , q−1 are occupied. Thus, transmission signals $s_i(0)$, $s_i(1)$, . . . , $s_i(q-1)$ are present in the received signals $x_i(0)$, $x_i(1)$, . . . , $x_i(q-1)$, respectively. In this example, received signals $x_i(q), x_i(q+1), \ldots, x_i(N-1)$ do not comprise transmission signals.

Features of embodiments described in the context of one signal of the first signal and the second signal, e.g. processing steps applied to one of the first signal and the second signal, may be analogously valid for, e.g. analogously applied to, the respective other signal of the first signal and the second signal and/or the one or more third signals.

In one embodiment, the method of determining whether transmission signals are present in received signals further comprises defining the second radio resource as unavailable for data transmission if it has been determined that the second transmission signal is present in the received second signal.

In one embodiment, the method of determining whether transmission signals are present in received signals further comprises defining the second radio resource as available for data transmission if it has been determined that no second transmission signal is present in the received second signal.

Figure 4:
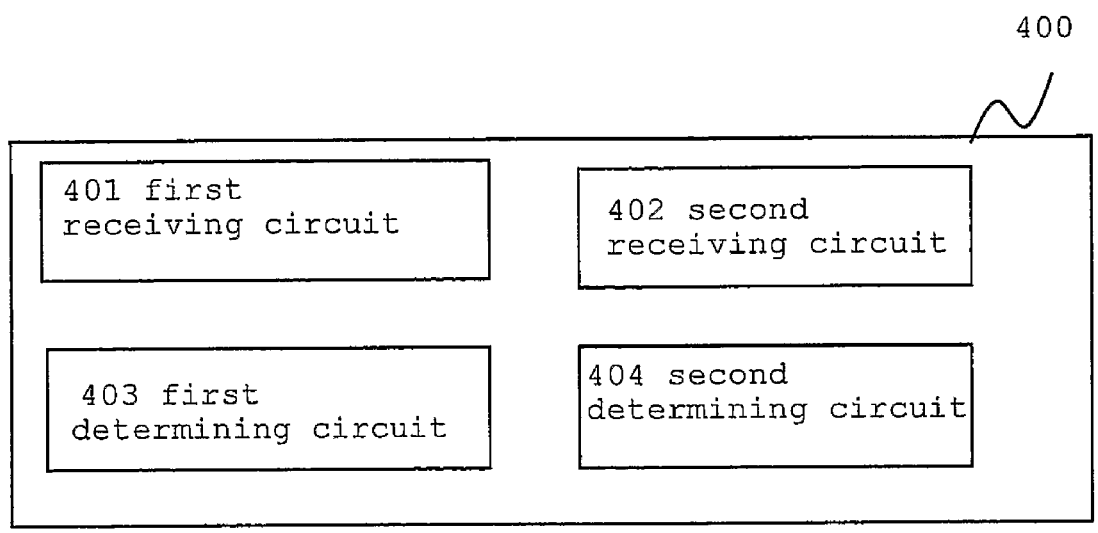
FIG. 4 illustrates a device according to one embodiment.

FIG. 4 illustrates a device for determining whether transmission signals are present in received signals 400 according to one embodiment. The device 300 comprises a first receiving circuit 401, a second receiving circuit 402, a first determining circuit 403, and a second determining circuit 404.

In one embodiment, the first receiving circuit 401 is configured to receive a first signal via a first radio resource.

In one embodiment, the second receiving circuit 402 is configured to receive a second signal via a second radio resource.

In one embodiment, the first determining circuit 403 is configured to determine whether a first transmission signal is present in the received first signal based on the received second signal.

In one embodiment, the second determining circuit 404 is configured to determine whether a second transmission signal is present in the received second signal based on the received first signal.

It should be noted that the first receiving circuit 401 and the second receiving circuit 402 may be implemented using the same circuit or the same receiver.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In one embodiment, a computer readable medium is provided having a program recorded thereon, wherein the program is adapted to make a processor of a computer perform a method for determining whether transmission signals are present in received signals.

In one embodiment, the computer readable medium comprises code of the program making the processor perform reception of a first signal via a first radio resource.

In one embodiment, the computer readable medium further comprises code of the program making the processor perform reception of a second signal via a second radio resource.

In one embodiment, the computer readable medium further comprises code of the program making the processor perform determination of whether a first transmission signal is present in the received first signal based on the received second signal.

In one embodiment, the computer readable medium further comprises code of the program making the processor perform determination of whether a second transmission signal is present in the received second signal based on the received first signal.

In the following, further embodiments of the method of determining whether transmission signals are present in received signals are illustrated.

In one scenario, it may be assumed that no information on the transmitted source signal is available at the receiver. In this context, the detection of presence of transmission signals in received signals under the assumption that no information on the transmitted source signal is available at the receiver may be referred to as blind detection. $s_i(n)$ may be modeled as a random variable with unknown distribution. Under this assumption, the transform function $\phi$ may be chosen as the identity function, that is, $\phi(t)=t$ for any t. Hence, in this case, $\hat{x}_i(n)=x_i(n)$.

As mentioned earlier, the number of occupied subcarrier q may be determined based on information theory. In the following, detection of transmission signals in received signals based on information theory according to one embodiment is described.

It may be assumed that $$x_i=[x_i(0) \ldots x_i(N-1)]^T, \quad (3)$$

$$s_i=[s_i(0) \ldots s_i(N-1)]^T, \quad (4)$$

$$\eta_i=[\eta_i(0) \ldots \eta_i(N-1)]^T. \quad (5)$$

The statistical covariance matrix of the received signal may be assumed to be $$R_x=E[x_i x_i^+] \quad (6)$$

It then may be verified that $$R_x=R_s+\sigma_\eta^2 I_N \quad (7)$$

where $R_s$ is the statistical covariance matrix of the source signal, and $I_N$ is identity matrix of size N. It may be seen that the rank of the matrix $R_s$ equals to the number of occupied subcarriers. Hence, the detection problem is equivalent to the detection of the rank of matrix $R_s$. This is a well-studied problem in signal processing. If the rank is found to be q, the q subcarriers with highest power are the occupied subcarriers.

In information theory, the minimum description length (MDL) and the Akaike information criteria (AIC) (cf. [2]) are two commonly used methods to find the rank. Both methods need the eigenvalues of statistical covariance matrix $R_x$. The maximum likelihood (ML) estimation for $R_x$ is the sample covariance matrix defined as $$\overline{R}_x(M) = \frac{1}{M}\sum_{i=0}^{M-1} x_i x_i^+ \quad (8)$$

The major difficulty is the eigenvalue decomposition if N is large (for example, in powerline communication N=256).

It is easy to verify that $$R_s=\mathrm{diag}(\rho(0),\ldots,\rho(N-1)) \quad (9)$$

where $$\rho(n)=E(|s_i(n)|^2) \quad (10)$$

Hence, the eigenvalues of $R_x$ are $$\rho(n)+\sigma_\eta^2=E(|x_i(n)|^2), n=0,1,\ldots,N-1 \quad (11)$$

A simple estimation for the eigenvalues is therefore the signal power $$\lambda(n) = E(|x_i(n)|^2) \approx \frac{1}{M} \sum_{i=0}^{M-1} |x_i(n)|^2, n = 0, 1, \ldots, N-1 \quad (12)$$

Based on this estimation and the AIC or MDL, the rank of matrix $R_s$ may be found.

In one embodiment, the method of determining the presence of transmission signals in received signals based on MDL is provided as follows. In this context, the method of determining the presence of transmission signals in received signals may be also referred to as the subcarrier/channel sensing method. The method may comprise the following steps.

In the first step, the average received signal power is computed:

$$y(n) = \frac{1}{M} \sum_{i=0}^{M-1} |x_i(n)|^2, n = 0, \ldots, N-1.$$

Then the sequence y(n) is reordered into $y_1(n)$ with descending order.

In the second step, the minimum description length is computed:

$$MDL_p = -M \log \frac{\prod_{n=p}^{N-1} y_1(n)}{\left(\sum_{n=p}^{N-1} y_1(n)/(N-P)\right)^{N-p}} + \alpha(M)p, \quad (13)$$

$$p = 0, 1, \ldots, N-1$$

where $\alpha(M)$ is a function of M satisfying: as M approaches to infinite, $\alpha(M) \to \infty$, $\alpha(M)/M \to 0$. For example, $\alpha(M)$ may be selected to be: $\alpha(M) = \lfloor \log_2(M) - 1 \rfloor$.

In the third step, $$q = \underset{p}{\operatorname{argmin}} MDL_p$$

is found, which is the estimation for the number of occupied subcarriers.

In the fourth step, the q subcarriers with highest powers are found and defined as occupied subcarriers.

In one embodiment, the method of subcarrier/channel sensing based on AIC is provided as follows.

In the first step, the average received signal power is computed:

$$y(n) = \frac{1}{M} \sum_{i=0}^{M-1} |x_i(n)|^2, n = 0, \ldots, N-1.$$

Then the sequence y(n) is reordered into $y_1(n)$ with descending order.

In the second step, the Akaike information criteria is computed:

$$AIC_p = -M \log \frac{\prod_{n=p}^{N-1} y_1(n)}{\left(\sum_{n=p}^{N-1} y_1(n)/(N-P)\right)^{N-p}} + 2p, \quad (14)$$

$$p = 0, 1, \ldots, N-1$$

In the third step, $$q = \underset{p}{\operatorname{argmin}} AIC_p$$

is found, which is the estimation for the number of occupied subcarriers.

In the fourth step, the q subcarriers with highest powers are found and defined as occupied subcarriers.

As mentioned earlier, the number of occupied subcarrier q may be determined based on successive energy comparison. In the following, detection of transmission signals in received signals based on successive energy comparison under the assumption that no information on the transmitted source signal is available at the receiver is provided according to one embodiment.

In one embodiment, the received signal energy at different subcarriers are firstly reordered from $$y(n) = \frac{1}{M} \sum_{i=0}^{M-1} |x_i(n)|^2, n = 0, \ldots, N-1$$

into $y_1(n)$ with descending order. That is, $y_1(0) \geq y_1(1) \geq \ldots \geq y_1(N-1)$. As M approaches to infinite and the number of vacant subcarriers is $K_v$, the $K_v$ subcarriers with least energies may have approximately the same energy as noise power, that is, approximately $$y_1(N-K_v) = \ldots = y_1(N-1) = \sigma_n^2 \quad (15)$$

where is the noise power. At the same time, the energy on any other subcarrier may be larger than the energy on these subcarriers, that is, $$y_1(N-K_v-1) > y_1(N-K_v) \quad (16)$$

The number of vacant subcarriers, $K_v$, is the first number p such that $$y_1(N-p) = \ldots = y_1(N-1), \text{ and } y_1(N-p-1) > y_1(N-p) \quad (17)$$

for p from 1 to N. Hence, the problem is to successively detect if equation (17) is satisfied and stop when equation (17) is satisfied.

However, in practice, M is a limited number, and therefore equation (17) may not be correct. In one embodiment, some errors may be allowed and the equality may be recognized within a certain range when M is not large. In the scenario when M is not large, two methods for detection of the number of occupied subcarriers are provided according to one embodiment as followed.

In one embodiment, a method of successive maximum to minimum (SMM) detection is used. The method comprises steps as follows.

In the first step, the average received signal power is computed:

$$y(n) = \frac{1}{M}\sum_{i=0}^{M-1}|x_i(n)|^2, n = 0, \ldots, N-1.$$

Then the sequence of y(n) is reordered into $y_1(n)$ with descending order.

In the second step, for q=1, 2, ... N, if $y_1(N-q)/y_1(N-1) > \gamma_{SMM}$, then $K_v = q-1$ and the testing is stopped. Otherwise, the testing is continued for q+1, where $\gamma_{SMM} > 1$ is a predetermined threshold.

In the third step, the $K_v$ subcarriers with lowest powers are found and defined as vacant subcarriers.

In another embodiment, a method of successive arithmetic to geometric mean (SAGM) detection is provided. The method comprises steps as described as follows.

In the first step, the average received signal power is computed:

$$y(n) = \frac{1}{M}\sum_{i=0}^{M-1}|x_i(n)|^2, n = 0, \ldots, N-1.$$

Then the sequence of y(n) is reordered into $y_1(n)$ with descending order.

In the second step, for q=1, 2, ..., N, if $$\frac{1}{q}\sum_{j=1}^{q}y_1(N-j) \Big/ \left(\prod_{j=1}^{q}y_1(N-1)\right)^{1/q} > \gamma_{SAGM},$$

then $K_v = q-1$ and the testing is stopped. Otherwise, testing is continued for q+1, where $\gamma_{SAGM} > 1$ is a predetermined threshold.

In the third step, the $K_v$ subcarriers with lowest powers are found and defined as vacant subcarriers.

In one embodiment, a method of determining the presence of transmission signals in received signals based on energy with minimum subcarriers detection under the assumption that no information on the transmitted source signal is available at the receiver is provided.

Energy detection (ED) may be seen as a fundamental method for sensing (cf. [3]). It may be directly used for subcarrier sensing. For ED, first a threshold γ may be set. If $y(n) > \gamma \sigma_\eta^2$, subcarrier n is occupied; otherwise, subcarrier n is not occupied, where $\sigma_\eta^2$ is the noise power. However, energy detection relies on the knowledge of accurate noise power, and inaccurate estimation of the noise power may lead to signal-to-noise ratio (SNR) wall and high probability of false alarm. That is, energy detection is vulnerable to the noise uncertainty. To solve this problem, the method of energy with the minimum subcarrier (EMS) detection is provided. The detection of transmission signals in received signals is based on the ratio of the subcarrier energy to the minimum subcarrier energy and a threshold, where the threshold may be not related to noise power and may be pre-computed once for all.

In one embodiment, the method of energy with the minimum subcarriers (EMS) detection comprises steps as follows.

In the first step, the average received signal power is computed:

$$y(n) = \frac{1}{M}\sum_{i=0}^{M-1}|x_i(n)|^2, n = 0, \ldots, N-1.$$

Then the sequence of y(n) is reordered into $y_1(n)$ with descending order.

In the second step, the average signal power of d minimum subcarriers $$\omega = \frac{1}{d}\sum_{q=1}^{d}y_1(N-q)$$

is computed, where d is a pre-assigned number.

In the third step, a threshold $\gamma_{EMS}$ is set. If $y(n) > \gamma_{EMS}\omega$, subcarrier n is occupied. Otherwise, subcarrier n is not occupied, where n=0, 1, ..., N-1.

In another scenario, it may be assumed the transmitted source signal is pilot/preamble which is known at the receiver. In this context, the detection of the presence of transmission signals in received signals when the transmitted source signal is pilot/preamble which is known at the receiver may be referred to as pilot/preamble based subcarrier/channel sensing.

$s_i(n)$ may be written as $$s_i(n) = H(n)\tilde{s}_i(n), n=0,1,\ldots,N-1; i=0,1,\ldots,M-1 \quad (18)$$

where $\tilde{s}_i(n)$ is the transmitted pilot/preamble which is known at the receiver, and H(n) is the frequency domain channel response. If a subcarrier n is not used, no signal is transmitted on the subcarrier. It may be assumed that the pilot/preamble $\tilde{s}_i(n)$ has constant modulus for different subcarriers, that is, for fixed i, $|\tilde{s}_i(n)|$ is constant for all n.

In one embodiment, it may be defined that $$\hat{x}_i(n) = x_i(n)\tilde{s}_i^*(n), n=0,1,\ldots,N-1; i=0,1,\ldots,M-1 \quad (19)$$

Hence, in this scenario, the transform function φ for subcarrier/channel n is chosen as a function such that $\phi(t) = t\tilde{s}_i^*(n)$ for any t.

For any subcarrier n, $$H_0: \hat{x}_i(n) = \eta_i(n)\tilde{s}_i^*(n), \quad (20)$$

$$H_1: \hat{x}_i(n) = H(n)|\tilde{s}_i(n)|^2 + \eta_i(n)\tilde{s}_i^*(n) \quad (21)$$

For notation simplicity, it may be defined that $$\hat{\eta}_i(n) = \eta_i(n)\tilde{s}_i^*(n), \hat{s}_i(n) = H(n)|\tilde{s}_i(n)|^2 \quad (22)$$

Since $\eta_i(n)$ is identically distributed and $\tilde{s}_i^*(n)$ is deterministic with constant modulus, $\hat{\eta}_i(n)$ is also identically distributed.

In one embodiment, a method of Pilot/preamble based subcarrier/channel sensing based on information theory is provided.

Based on similar derivations as described in relation to blind detection earlier, sensing methods are provided based on information theory as follows.

It may be defined that $$\hat{y}(n) = \frac{1}{M}\sum_{i=0}^{M-1}|\hat{x}_i(n)|^2, n = 0, \ldots, N-1 \quad (23)$$

Then $\hat{y}(n)$ is reordered into $\hat{y}_1(n)$ with descending order, that is, $\hat{y}_1(0) \geq \hat{y}_1(1) \geq \ldots \geq \hat{y}_1(N-1)$.

In one embodiment, a method of Pilot/preamble subcarrier sensing based on minimum description length (PSMDL) is provided. The method comprises steps as follows.

In the first step, the received signal is matched with the pilot/preamble to get $\hat{x}_i(n) = x_i(n)\tilde{s}_i(n)$.

In the second step, the average transformed signal power $\hat{y}(n)$ is computed and the sequence of $\hat{y}(n)$ is reordered into $\hat{y}_1(n)$ with descending order.

In the third step, the minimum description length is computed:

$$MDL_p = -M \log \frac{\prod_{n=p}^{N-1} \hat{y}_1(n)}{\left(\sum_{n=p}^{N-1} \hat{y}_1(n)/(N-P)\right)^{N-p}} + \alpha(M)p, \quad (24)$$

$$p = 0, 1, \ldots, N-1$$

where $\alpha(M)$ is a function of M satisfying: as M approaches to infinite, $\alpha(M) \to \infty$, $\alpha(M)/M \to 0$. For example, $\alpha(M)$ may be set to be: $\alpha(M) = \lfloor \log_2(M) - 1 \rfloor$.

In the fourth step, $$q = \underset{p}{\arg\min} \, MDL_p$$

is found, which is the estimation for the number of occupied subcarriers.

In the fifth step, the q subcarriers with highest powers are found and defined as occupied subcarriers.

In another embodiment, a method of Pilot/preamble subcarrier sensing based on Akaike information criteria (PSAIC) is provided. The method may comprise steps as follows.

In the first step, the received signal is matched with the pilot/preamble to get $\hat{x}_i(n) = x_i(n)\tilde{s}_i^*(n)$.

In the second step, the average transformed signal power $\hat{y}(n)$ is computed and the sequence of $\hat{y}(n)$ is reordered into $\hat{y}_1(n)$ with descending order.

In the third step, the Akaike information criteria is computed:

$$AIC_p = -M \log \frac{\prod_{n=p}^{N-1} \hat{y}_1(n)}{\left(\sum_{n=p}^{N-1} \hat{y}_1(n)/(N-P)\right)^{N-p}} + 2p, \quad (25)$$

$$p = 0, 1, \ldots, N-1$$

In the fourth step, $$q = \underset{p}{\arg\min} \, AIC_p$$

is found, which is the estimation for the number of occupied subcarriers.

In the fifth step, the q subcarriers with highest powers are found and defined as occupied subcarriers.

In one embodiment, methods for detection of transmission signals in received signals based on successive energy comparison under the assumption that the transmitted source signal is pilot/preamble which is known at the receiver are provided.

In one embodiment, similar to the derivation as described in relation to blind detection earlier, a method Pilot/preamble based successive maximum to minimum (PSMM) detection is provided. The method may comprise the following steps.

In the first step, the received signal is matched with the pilot/preamble to get $\hat{x}_i(n) = x_i(n)\tilde{s}_i^*(n)$.

In the second step, the average transformed signal power $\hat{y}(n)$ is computed and the sequence of $\hat{y}(n)$ is reordered into $\hat{y}_1(n)$ with descending order.

In the third step, for $q = 1, 2, \ldots N$, if $\hat{y}_1(N-q)/\hat{y}_1(N-1) > \gamma_{PSMM}$, then $K_v = q-1$ and the testing is stopped. Otherwise, the testing is continued for $q+1$, where $\gamma_{PSMM} > 1$ is a predetermined threshold.

In the fourth step, the $K_v$ subcarriers with lowest powers are found and defined as vacant subcarriers.

In another embodiment, a method of Pilot/preamble successive arithmetic to geometric mean (PSAGM) detection is provided. The method comprises the following steps.

In the first step, the received signal is matched with the pilot/preamble to get $\hat{x}_i(n) = x_i(n)\tilde{s}_i^*(n)$.

In the second step, the average transformed signal power $\hat{y}(n)$ is computed and the sequence of $\hat{y}(n)$ is reordered into $\hat{y}_1(n)$ with descending order.

In the third step, for $q = 1, 2, \ldots, N$, if $$\frac{1}{q}\sum_{j=1}^{q} \hat{y}_1(N-j) \bigg/ \left(\prod_{j=1}^{q} \hat{y}_1(N-1)\right)^{1/q} > \gamma_{PSAGM},$$

then $K_v = q-1$ and the testing is stopped. Otherwise, the testing is continued for $q+1$, where $\gamma_{PSAGM} > 1$ is a predetermined threshold.

In the fourth step, the $K_v$ subcarriers with lowest powers are found and defined as vacant subcarriers.

In one embodiment, a method of detection of presence of transmission signals based on energy with the minimum subcarrier under the assumption that the transmitted source signal is pilot/preamble which is known at the receiver is provided. In one embodiment, the method may comprise the following steps.

In the first step, the average received signal power is computed:

$$\hat{y}(n) = \frac{1}{M} \sum_{i=0}^{M-1} |\hat{x}_i(n)|^2, n = 0, \ldots, N-1.$$

Then the sequence of $\hat{y}(n)$ is reordered into $\hat{y}_1(n)$ with descending order.

In the second step, the average signal power of d minimum subcarriers $$\hat{\omega} = \frac{1}{d}\sum_{q=1}^{d} \hat{y}_1(N-q)$$

is computed, where d is a pre-assigned number. For example, the number d may be chosen as the number of subcarriers in the guard band of the OFDM symbols or simply be chosen as 1.

In the third step, a threshold $\gamma_{PEMS}$ is set. If $\hat{y}(n) > \gamma_{PEMS}\hat{\omega}$, subcarrier n is occupied. Otherwise, subcarrier n is not occupied, where n=0, 1, ..., N−1.

Simulations have been carried out in order to test the performance of the method described herein. The simulation settings are as follows.
1) N=256;
2) CP length is 172;
3) Channel length is not larger than CP length.
4) QPSK modulated signal;
5) The receiver is synchronized with the transmitter.

Some parameters used in the simulations are defined as follows.
1) Match rate: $r_1/r$, where $r_1$ is the number of correct (detected rank is exactly the actual rank) detections, and r is the total number of detections;
2) Mean ratio: $s_1/s$, where $s_1$ the mean of detected rank, and s is the actual rank;
3) Variance: standard deviation of the detected rank for 200 simulations.

For the energy with the minimum subcarriers (EMS) method, d is chosen to be 1. The thresholds are set based on noise only case (under hypothesis $H_0$) for all methods.

1. Simulation for Blind Methods

In the following, M is set to be 20. Randomly generated channels are used. Based on the thresholds, the performances of the methods when no subcarrier is occupied are first tested. At no signal case, the SMDL, SAIC, ED, ED-1 dB (ED with 1 dB noise uncertainty) EMS, SMM and SAGM have detected the rank (average on 200 tests) as 12.43, 5.95, 4.48, 10.28, 5.80, 4.49 and 4.65, respectively, and have variance as 4.15, 2.62, 2.15, 12.25, 12.58, 10.22 and 16.39, respectively.

FIGS. 5 to 13 illustrate detection performances when some subcarriers are occupied.

Figure 5:
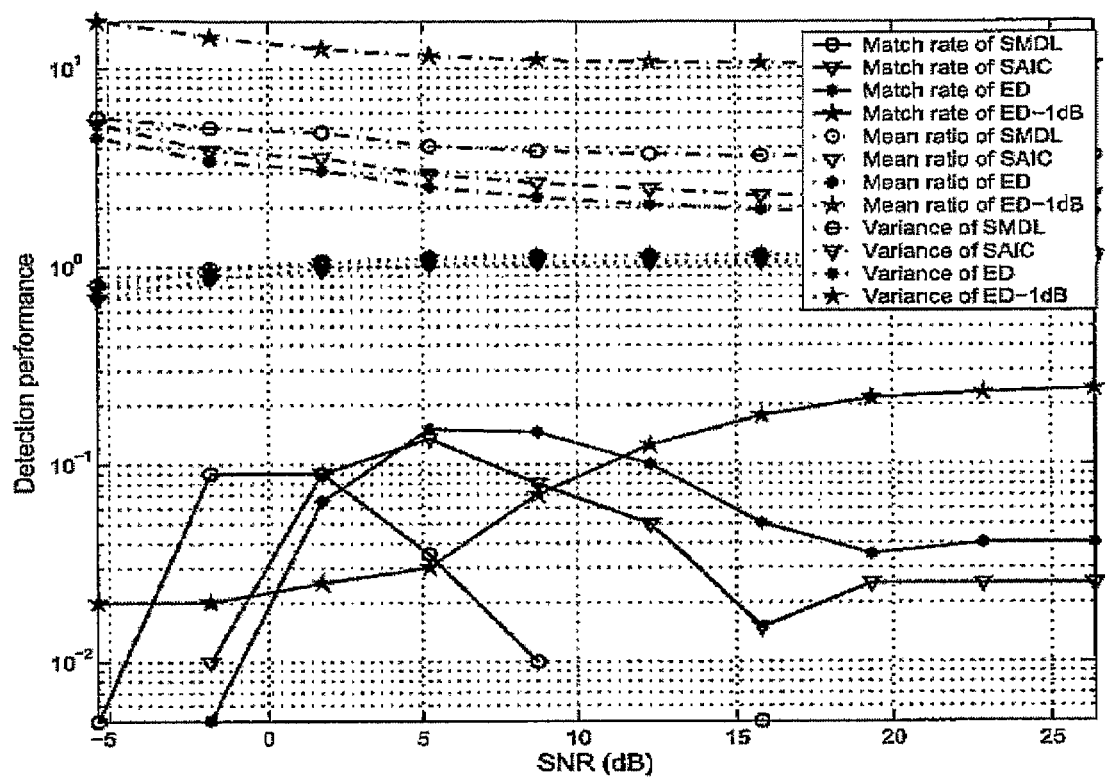
FIG. 5 illustrates simulation results of blind detection performance.

FIG. 5 illustrates measurements of parameters of match rate, mean ratio, and variance using blind detection methods of SMDL (subcarrier sensing based on minimum description length), SAIC (subcarrier sensing based on Akaike information criteria), ED (energy detection), and ED-1 dB (energy detection with 1 dB noise), respectively. q is set to be 64, where q represents the number of occupied subcarriers.

Figure 6:
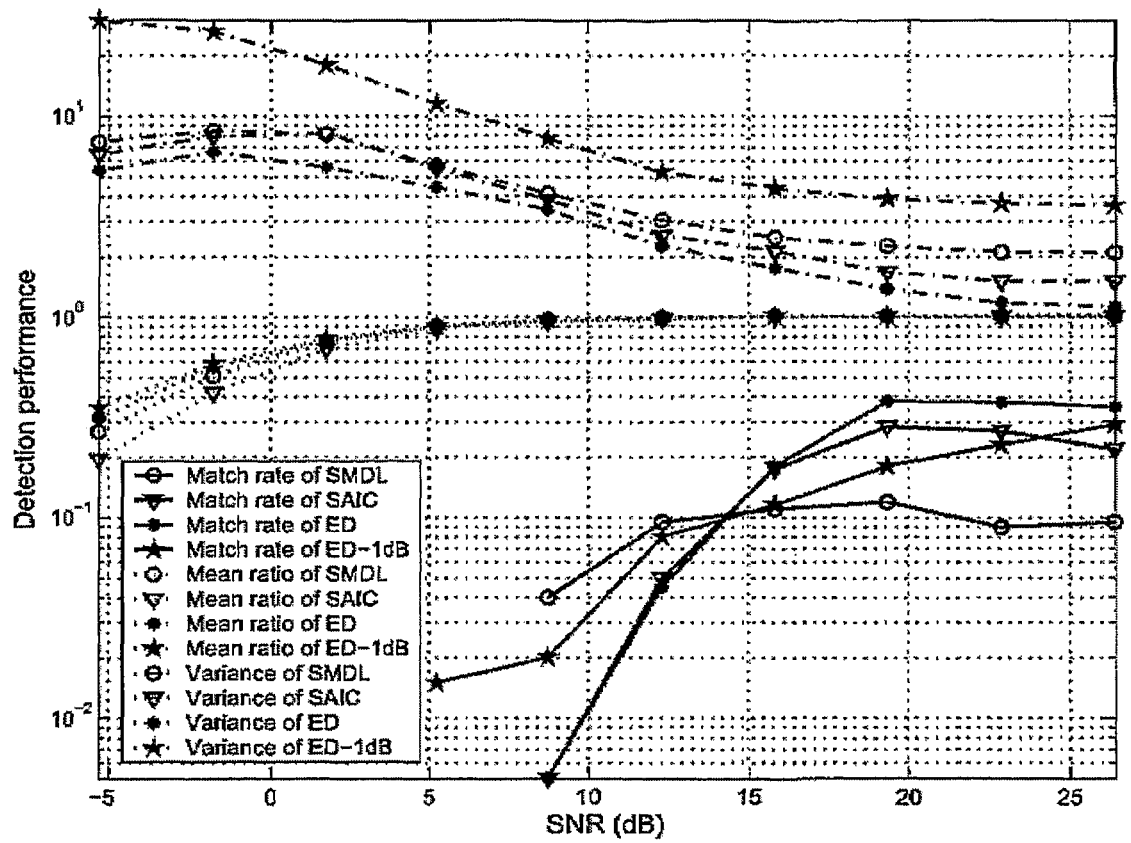
FIG. 6 shows simulation results of blind detection performance.

FIG. 6 illustrates measurements of parameters of match rate, mean ratio, and variance using blind detection methods of SMDL, SAIC, ED, and ED-1 dB, respectively. q is set to be 192.

Figure 7:
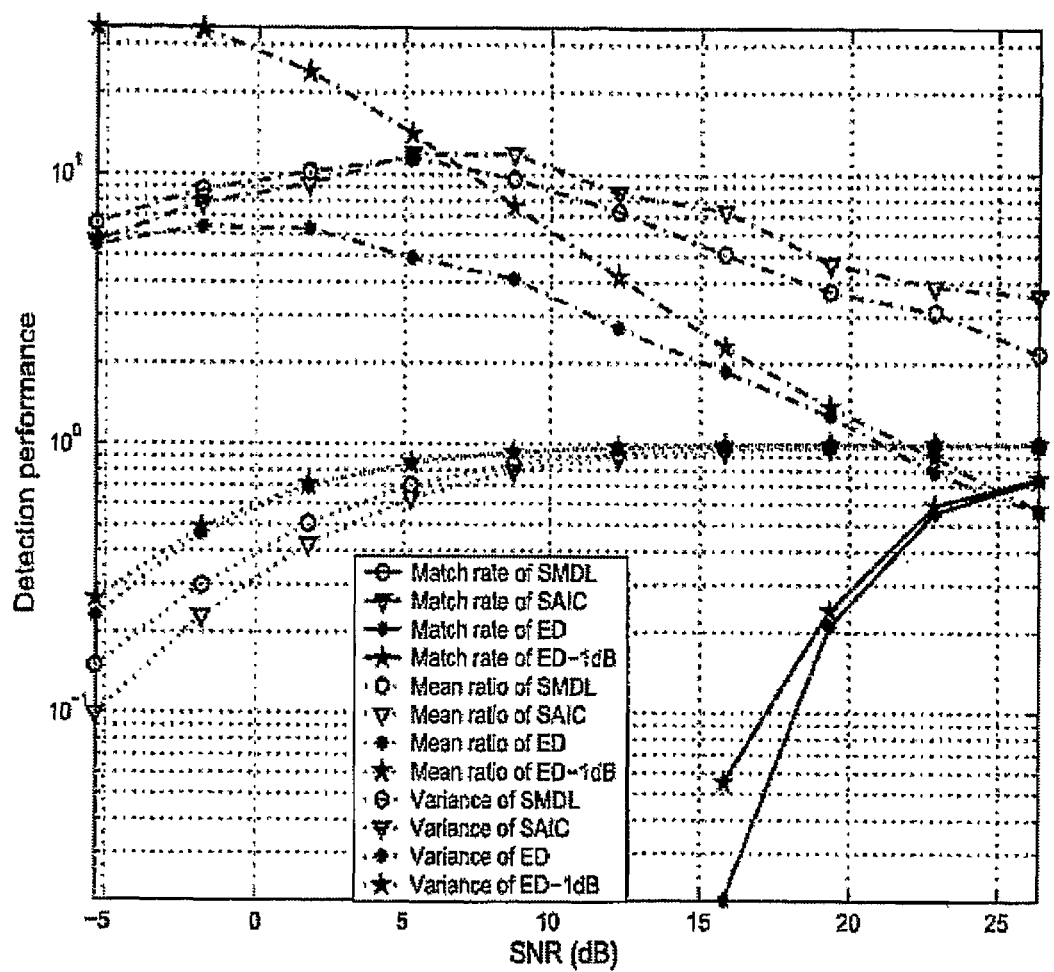
FIG. 7 illustrates simulation results of blind detection performance.

FIG. 7 illustrates measurements of parameters of match rate, mean ratio, and variance using blind detection methods of SMDL, SAIC, ED, and ED-1 dB, respectively. q is set to be 256.

Figure 8:
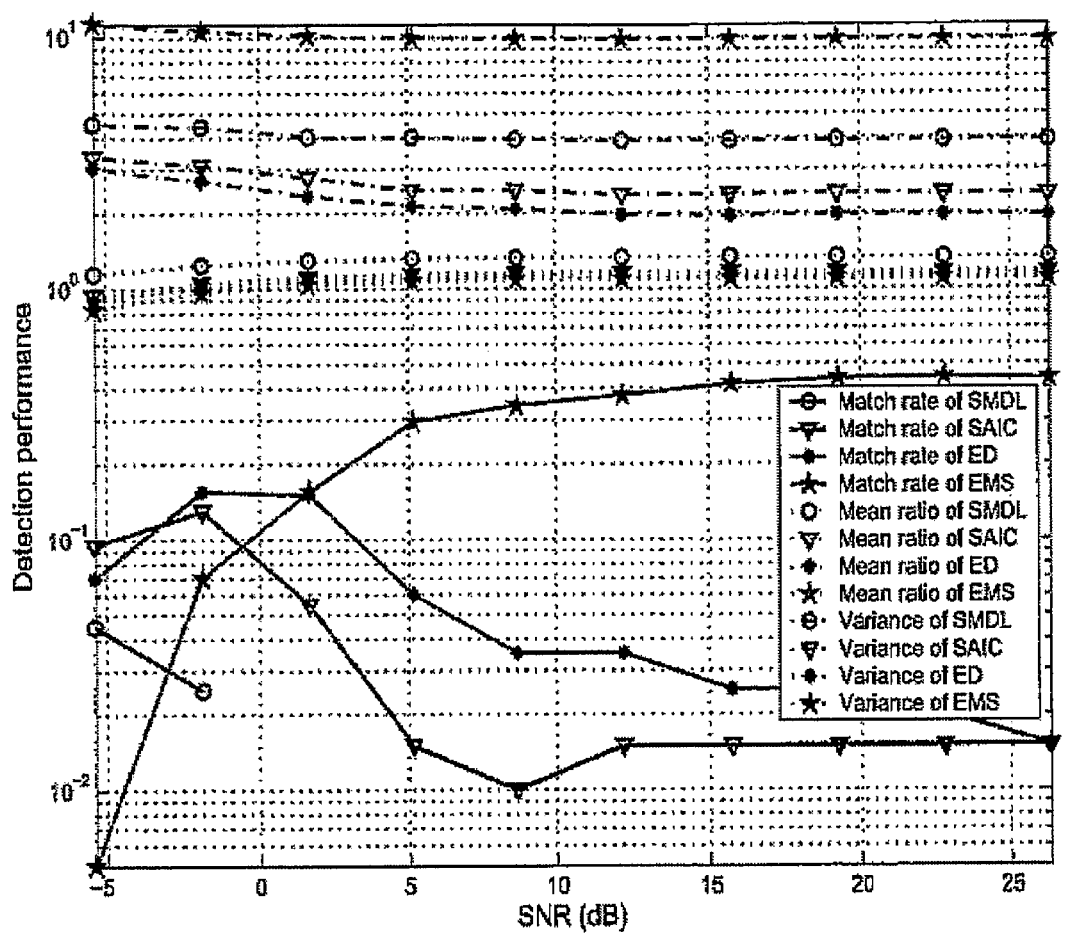
FIG. 8 illustrates simulation results of blind detection performance.

FIG. 8 illustrates measurements of parameters of match rate, mean ratio, and variance using blind detection methods of SMDL, SAIC, ED, and EMS (energy with minimum subcarriers detection), respectively. q is set to be 32.

Figure 9:
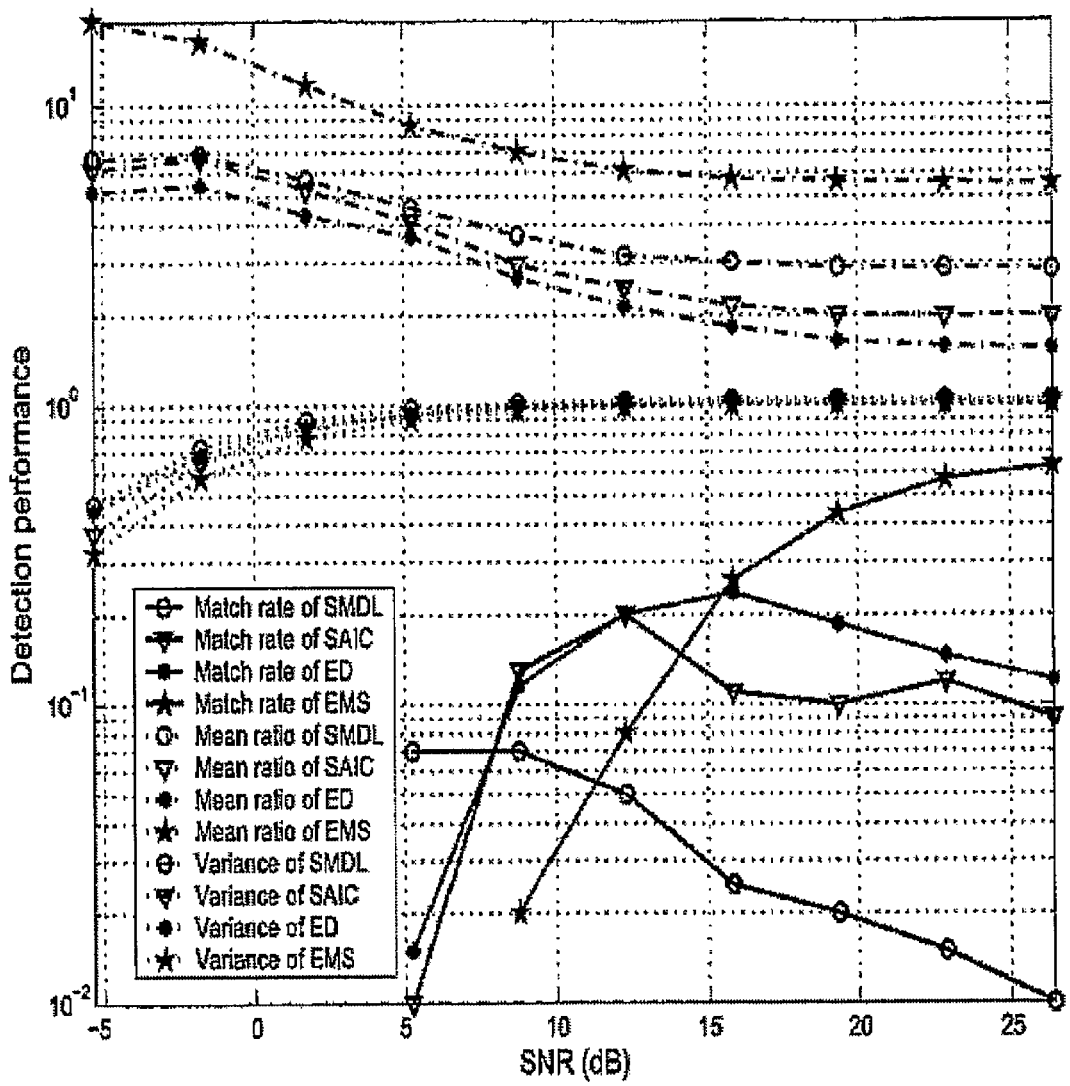
FIG. 9 illustrates simulation results of blind detection performance.

FIG. 9 illustrates measurements of parameters of match rate, mean ratio, and variance using blind detection methods of SMDL, SAIC, ED, and EMS, respectively. q is set to be 128.

Figure 10:
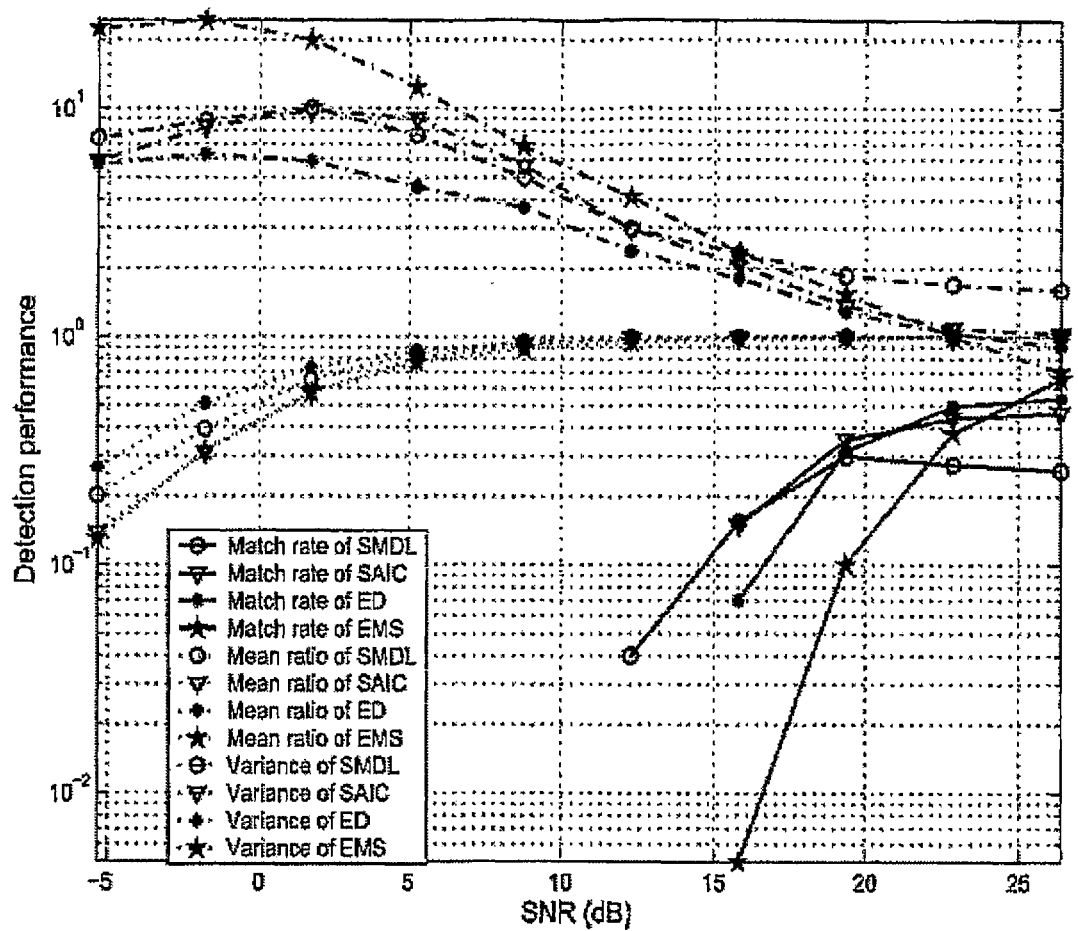
FIG. 10 illustrates simulation results of blind detection performance.

FIG. 10 illustrates measurements of parameters of match rate, mean ratio, and variance using blind detection methods of SMDL, SAIC, ED, and EMS, respectively. q is set to be 224.

Figure 11:
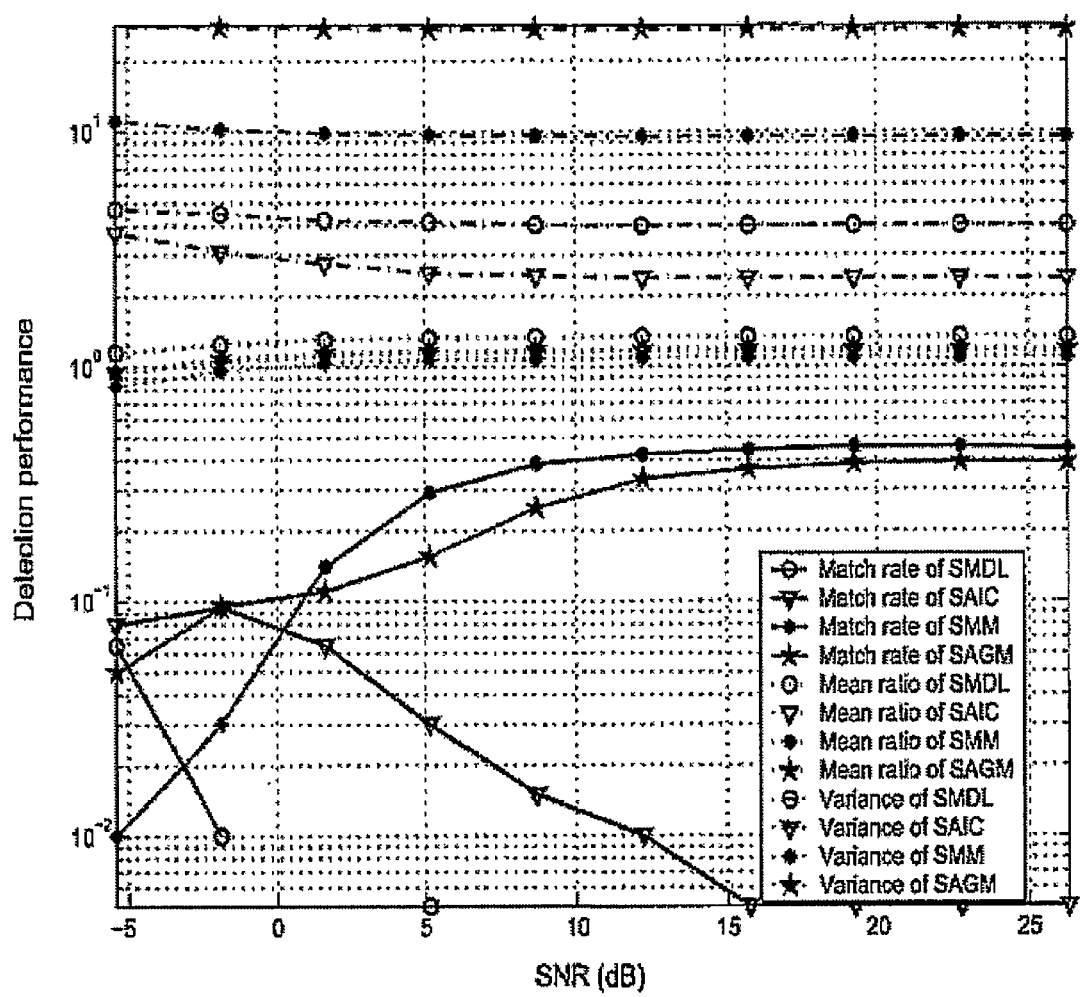
FIG. 11 illustrates simulation results of blind detection performance.

FIG. 11 illustrates measurements of parameters of match rate, mean ratio, and variance using blind detection methods of SMDL, SAIC, SMM (successive maximum to minimum detection), and SAGM (successive arithmetic to geometric mean detection), respectively. q is set to be 32.

Figure 12:
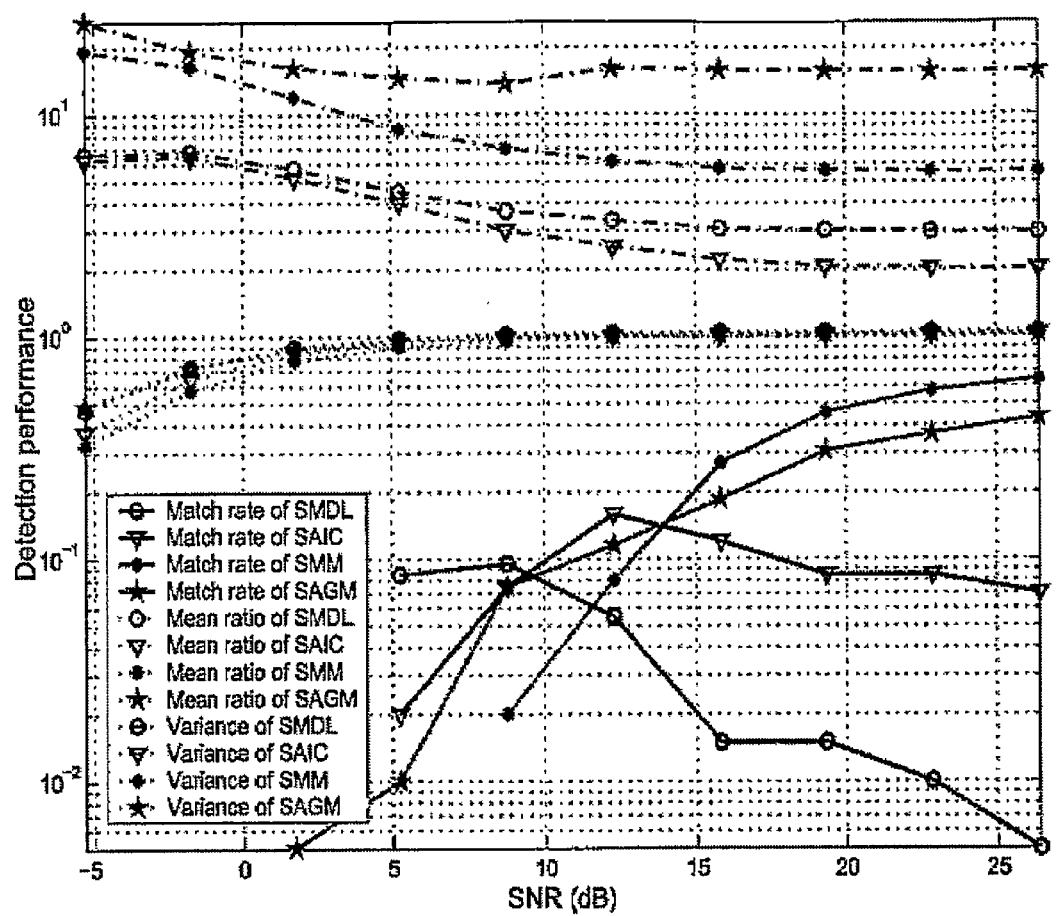
FIG. 12 illustrates simulation results of blind detection performance.

FIG. 12 illustrates measurements of parameters of match rate, mean ratio, and variance using blind detection methods of SMDL, SAIC, SMM, and SAGM, respectively. q is set to be 128.

Figure 13:
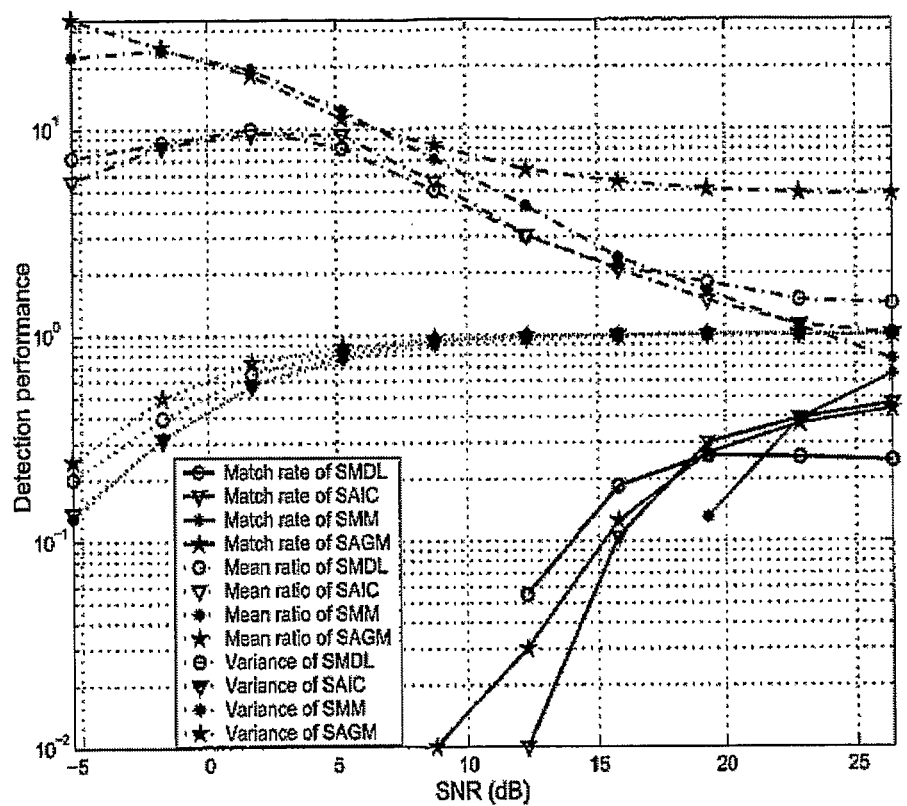
FIG. 13 illustrates simulation results of blind detection performance.

FIG. 13 illustrates measurements of parameters of match rate, mean ratio, and variance using blind detection methods of SMDL, SAIC, SMM, and SAGM, respectively. q is set to be 224.

Simulations show that SAIC, SMM, SMDL and EMS are the best among the proposed methods. ED with exact noise power performs best in all methods. However, when there is noise uncertainty in practical applications, performance of ED degrades dramatically. In fact, ED with 1 dB noise uncertainty is the worst among all the methods.

2. Simulation for Pilot/Preamble Based Methods

M is chosen to be 10. The preamble signals are BPSK modulated. When no subcarrier is occupied, the PSMDL, PSAIC, PSMM and PSAGM have detected the rank (average on 200 tests) as 20.97, 5.59, 5.43 and 6.55, respectively, and have variance as 5.39, 2.66, 12.99 and 26.54, respectively.

Figure 14:
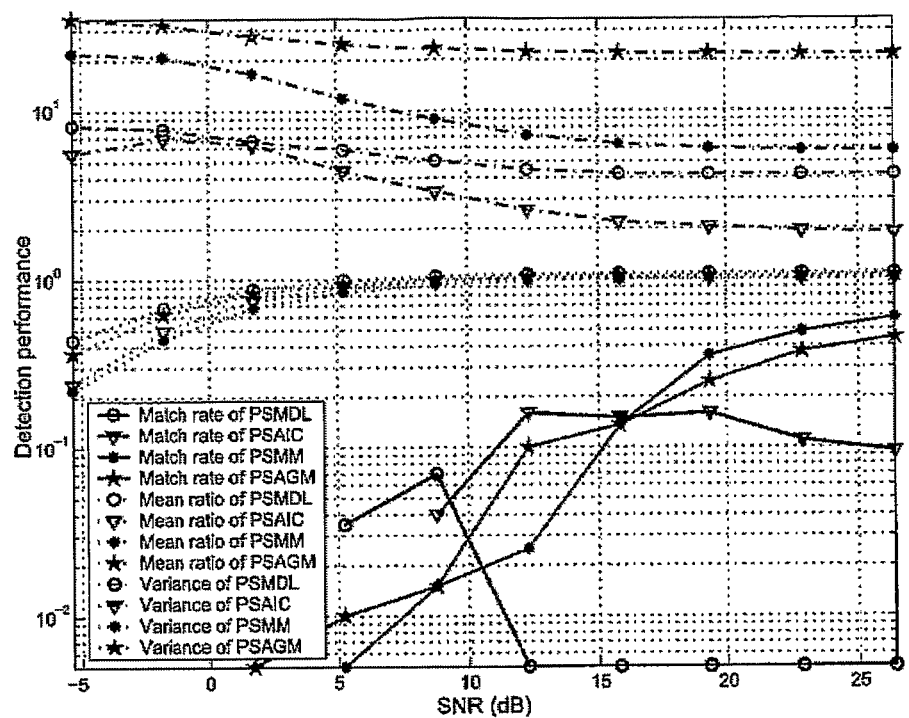
FIG. 14 illustrates simulation results of pilot/preamble detection performance.

First, randomly generated channels are used. FIG. 14 illustrates detection performance when some subcarriers are occupied. Measurements of parameters of match rate, mean ratio, and variance using pilot/preamble based detection methods of PSMDL, PSAIC, PSMM, and PSAGM are shown in FIG. 14 respectively. q is set to be 128.

Figure 15:
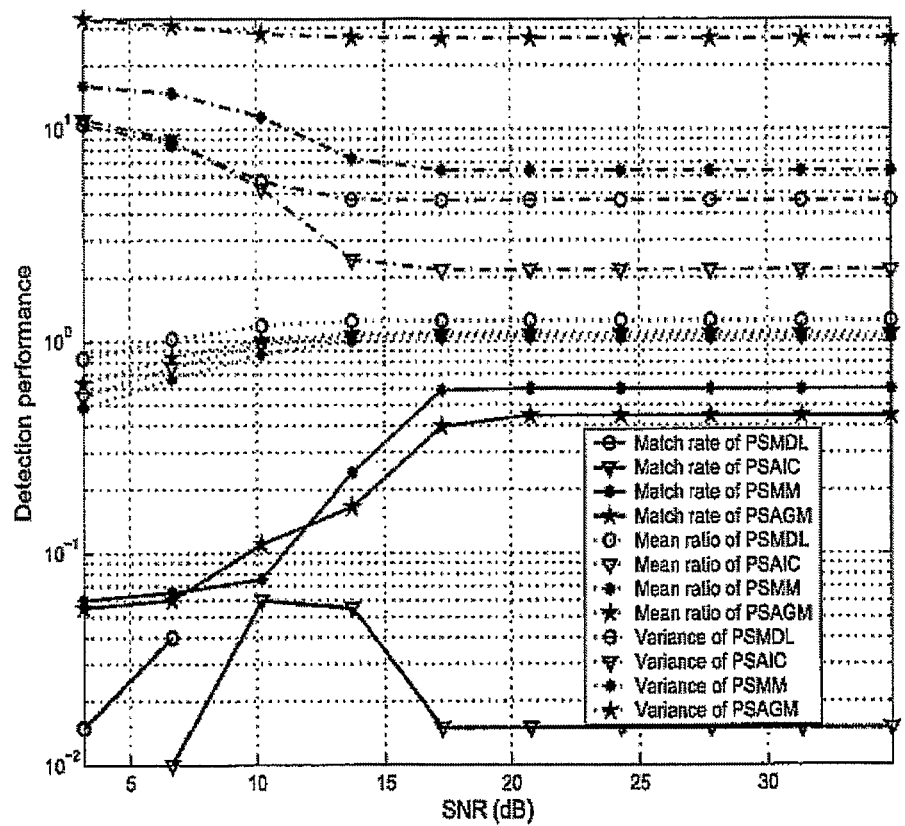
FIG. 15 illustrates simulation results of pilot/preamble detection performance.

Secondly, simulated powerline channels (cf. [4]) are used. FIG. 15 illustrates measurements of parameters of match rate, mean ratio, and variance using pilot/preamble based detection methods of PSMDL, PSAIC, PSMM, and PSAGM, respectively, when some subcarriers are occupied. q is set to be 64.

Figure 16:
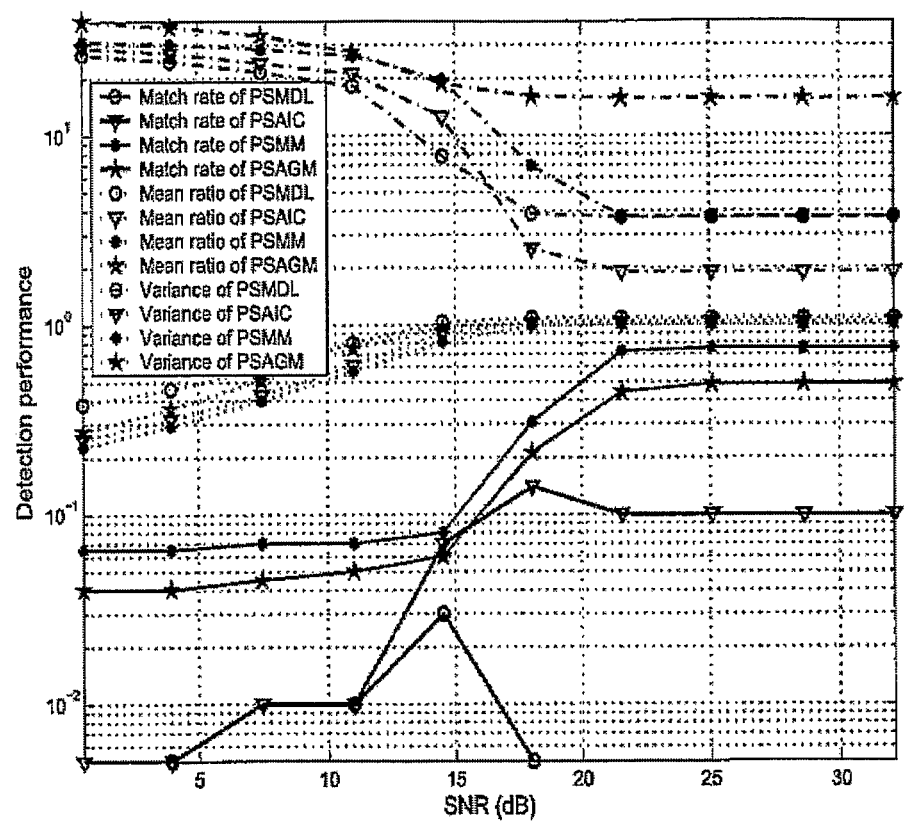
FIG. 16 illustrates simulation results of pilot/preamble detection performance.

FIG. 16 illustrates measurements of parameters of match rate, mean ratio, and variance using pilot/preamble based detection methods of PSMDL, PSAIC, PSMM, and PSAGM, respectively, when some subcarriers are occupied. q is set to be 128.

Similar observations for blind methods are correct for pilot/preamble based methods. The detection performance for powerline channel is worse than that for randomly generated channel. This is because powerline channel is more likely to create deep fading subcarriers.

For all the methods, the detected rank (number of occupied subcarriers) approaches to the actual rank for most cases at SNR higher than 15 dB. The detected rank usually is not exactly the same as the actual rank. Some post-processing may be used to finally determine the occupied subcarriers. The post-processing may be looking at the locations of the subcarriers. Deep fading for some subcarriers may cause wrong classification of the subcarriers.

Figure 17:
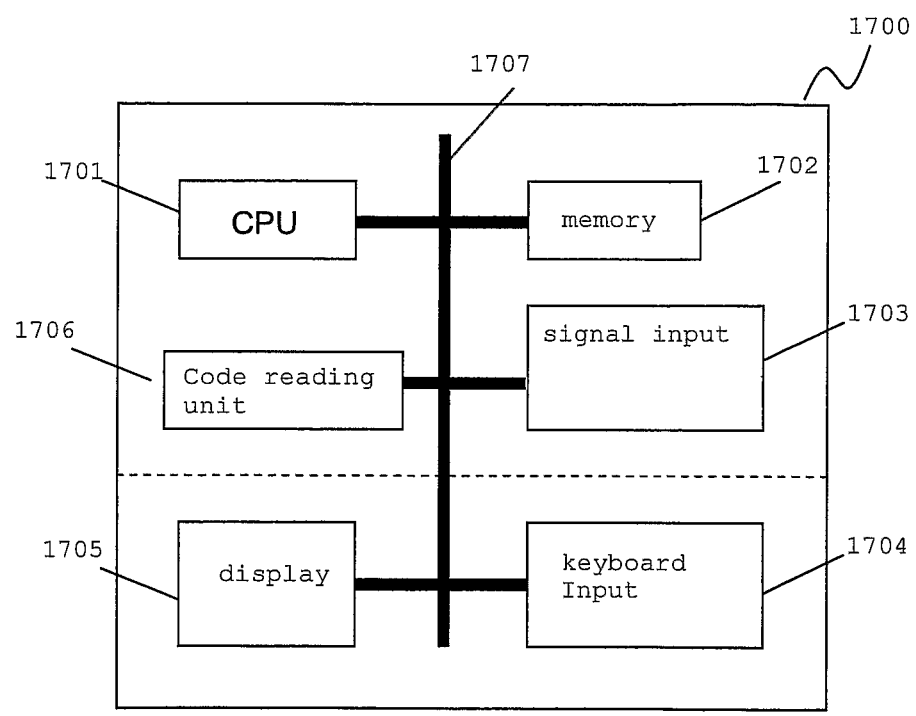
FIG. 17 illustrates a computer according to one embodiment.

FIG. 17 illustrates a computer 1700 according to one embodiment.

In one embodiment, the computer 1700 may include a processor 1701. In one embodiment, the computer 1700 may further comprise a memory 1702. In one embodiment, the computer 1700 may further comprise input 1703 for receiving a first signal and a second signal or a transformed first signal and a transformed second signal. In one embodiment, the computer 1700 may further comprise a communication device input 1704. In one embodiment, the computer 1700 may further comprise a display 1705. In one embodiment, the computer 1700 may further comprise a code reading unit 1706 for reading code from another computer readable medium. For example, all the component of the computer 1700 are connected with each other through a computer bus 1707.

In one embodiment, the memory 1702 may have a program recorded thereon, wherein the program is adapted to make a processor 1701 perform a method for determining whether transmission signals are present in received signals, the memory 1702 comprising code of the program making the processor 1701 perform reception of a first signal via a first radio resource; code of the program making the processor 1701 perform reception of a second signal via a second radio resource; code of the program making the processor 1701 perform determination of whether a first transmission signal is present in the received first signal based on the received second signal; and code of the program making the processor 1701 perform determination of whether a second transmission signal is present in the received second signal based on the received first signal.

In one embodiment, the processor 1701 reads the program on the memory 1702 to perform the program of determining whether transmission signals are present in received signals.

In one embodiment, the processor 1701 obtains input from the communication device, i.e. a threshold such as $\gamma_{PSMM}$ and $\gamma_{PSAGM}$, through communication device input 1704.

In one embodiment, the program code may be recorded on another computer readable medium (not shown). In this case, the processor 1701 may read the codes from the other computer readable medium through code reading unit 1706, and perform the method for determining whether transmission signals are present in received signals as described herein.

While the invention has been particularly shown and described with reference to specific embodiments, it should be understood by those skilled in the art that various changes in form and detail may be made therein without departing from the scope of the invention as defined by the appended claims. The scope of the invention is thus indicated by the appended claims and all changes which come within the meaning and range of equivalency of the claims are therefore intended to be embraced.

In this document, the following documents are cited:

[1] T. A. Weiss and F. K. Jondral, "Spectrum pooling: an innovative strategy for the enhancement of spectrum efficiency," *IEEE Radio Communications*, pp. S8-S14, March 2004.

[2] M. Wax and T. Kailath, "Detection of signals by information theoretic criteria," *IEEE Trans. Acoust., Speech, Signal Processing*, vol. 33, pp. 387-392, April 1985.

[3] A. Sonnenschein and P. M. Fishman, "Radiometric detection of spread-spectrum signals in noise of uncertainty power," *IEEE Trans. On Aerospace and Electronic Systems*, vol. 28, no. 3, pp. 654-660, 1992.

[4] T. Esmailian, F. R. Kschischang, and P. G. Gulak, "In-building power lines as high-speed communication channels: channel characterization and a test channel ensemble," *International Journal of Communication Systems*, vol. 16, pp. 381-400, 2003.

What is claimed is:

1. A method for determining whether transmission signals are present in received signals, the method comprising:
   receiving a first signal via a first radio resource;
   receiving a second signal via a second radio resource;
   determining whether a first transmission signal is present in the received first signal based on the received second signal; and
   determining whether a second transmission signal is present in the received second signal based on the received first signal;
   wherein determining whether the first transmission signal is present in the received first signal comprises determining a measure of the average power of the received second signal and wherein it is determined whether the first transmission signal is present in the received first signal based on the determined measure of the average power of the received second signal;
   wherein the received second signal comprises a plurality of signal values and the measure of the average power of the received second signal is determined based on a combination of the signal values; and
   wherein for each signal value, a measure of the signal value based on the absolute value of the signal value is determined and the combination of the signal values is an average of the measures of the signal values.

2. The method according to claim 1, wherein it is determined whether the first transmission signal is present in the received first signal based on the received second signal and the received first signal.

3. The method according to claim 1, wherein the measure of the average power is determined based on an average of the squared absolute values of the signal values.

4. The method according to claim 1, wherein the first radio resource is at least one first carrier signal.

5. The method according to claim 1, wherein the second radio resource is at least one second carrier signal.

6. The method according to claim 1, wherein the first radio resource is a first frequency range.

7. The method according to claim 1, wherein the second radio resource is a second frequency range.

8. The method according to claim 1, wherein the first radio resource is a first communication channel.

9. The method according to claim 1, wherein the second radio resource is a second communication channel.

10. The method according to claim 1, wherein the first signal and the second signal are, at least partially, received simultaneously.

11. The method according to claim 1, further comprising defining the second radio resource as unavailable for data transmission if it has been determined that the second transmission signal is present in the received second signal.

12. The method according to claim 1, further comprising defining the second radio resource as available for data transmission if it has been determined that no second transmission signal is present in the received second signal.

13. A method for determining whether transmission signals are present in received signals, the method comprising:
   receiving a first signal via a first radio resource;
   receiving a second signal via a second radio resource;
   determining whether a first transmission signal is present in the received first signal based on the received second signal; and
   determining whether a second transmission signal is present in the received second signal based on the received first signal;
   wherein determining whether the first transmission signal is present in the received first signal comprises determining a measure of the average power of the received second signal and wherein it is determined whether the first transmission signal is present in the received first signal based on the determined measure of the average power of the received second signal;
   wherein determining whether the first transmission signal is present in the received first signal further comprises determining a measure of the average power of the received first signal and wherein it is determined whether the first transmission signal is present in the received first signal based on the determined measure of the average power of the received second signal and the measure of the determined average power of the received first signal; and wherein it is determined whether the first transmission signal is present in the received first signal based on a comparison of the measure of the average power of the received first signal with the measure of the average power of the received second signal.

14. The method according to claim 1, further comprising receiving one or more third signals, wherein each of the one or more third signals is received via a respective third radio resource of one or more third radio resources; and determining, for each of the one or more third signals, whether a respective third transmission signal is present in the received third signal based on the received first signal.

15. A device for determining whether transmission signals are present in received signals, the device comprising:
 a first receiving circuit being configured to receive a first signal via a first radio resource;
 a second receiving circuit being configured to receive a second signal via a second radio resource;
 a first determining circuit being configured to determine whether a first transmission signal is present in the received first signal based on the received second signal; and
 a second determining circuit being configured to determine whether a second transmission signal is present in the received second signal based on the received first signal;
 wherein determining whether the first transmission signal is present in the received first signal comprises determining a measure of the average power of the received second signal and wherein it is determined whether the first transmission signal is present in the received first signal based on the determined measure of the average power of the received second signal;
 wherein the received second signal comprises a plurality of signal values and the measure of the average power of the received second signal is determined based on a combination of the signal values; and
 wherein for each signal value, a measure of the signal value based on the absolute value of the signal value is determined and the combination of the signal values is an average of the measures of the signal values.

16. A non-transitory computer readable medium having a program recorded thereon, wherein the program is adapted to make a processor of a computer perform a method for determining whether transmission signals are present in received signals, the non-transitory computer readable medium comprising
 code of the program making the processor perform reception of a first signal via a first radio resource;
 code of the program making the processor perform reception of a second signal via a second radio resource;
 code of the program making the processor perform determination of whether a first transmission signal is present in the received first signal based on the received second signal; and
 code of the program making the processor perform determination of whether a second transmission signal is present in the received second signal based on the received first signal;
 wherein determining whether the first transmission signal is present in the received first signal comprises determining a measure of the average power of the received second signal and wherein it is determined whether the first transmission signal is present in the received first signal based on the determined measure of the average power of the received second signal;
 wherein the received second signal comprises a plurality of signal values and the measure of the average power of the received second signal is determined based on a combination of the signal values; and
 wherein for each signal value, a measure of the signal value based on the absolute value of the signal value is determined and the combination of the signal values is an average of the measures of the signal values.

17. A device for determining whether transmission signals are present in received signals, the device comprising:
 a first receiving circuit being configured to receive a first signal via a first radio resource;
 a second receiving circuit being configured to receive a second signal via a second radio resource;
 a first determining circuit being configured to determine whether a first transmission signal is present in the received first signal based on the received second signal; and
 a second determining circuit being configured to determine whether a second transmission signal is present in the received second signal based on the received first signal;
 wherein determining whether the first transmission signal is present in the received first signal comprises determining a measure of the average power of the received second signal and wherein it is determined whether the first transmission signal is present in the received first signal based on the determined measure of the average power of the received second signal;
 wherein determining whether the first transmission signal is present in the received first signal further comprises determining a measure of the average power of the received first signal and wherein it is determined whether the first transmission signal is present in the received first signal based on the determined measure of the average power of the received second signal and the measure of the determined average power of the received first signal; and
 wherein it is determined whether the first transmission signal is present in the received first signal based on a comparison of the measure of the average power of the received first signal with the measure of the average power of the received second signal.

18. A non-transitory computer readable medium having a program recorded thereon, wherein the program is adapted to make a processor of a computer perform a method for determining whether transmission signals are present in received signals, the non-transitory computer readable medium comprising
 code of the program making the processor perform reception of a first signal via a first radio resource;
 code of the program making the processor perform reception of a second signal via a second radio resource;
 code of the program making the processor perform determination of whether a first transmission signal is present in the received first signal based on the received second signal; and
 code of the program making the processor perform determination of whether a second transmission signal is present in the received second signal based on the received first signal;
 wherein determining whether the first transmission signal is present in the received first signal comprises determining a measure of the average power of the received second signal and wherein it is determined whether the first transmission signal is present in the received first signal based on the determined measure of the average power of the received second signal;

wherein determining whether the first transmission signal is present in the received first signal further comprises determining a measure of the average power of the received first signal and wherein it is determined whether the first transmission signal is present in the received first signal based on the determined measure of the average power of the received second signal and the measure of the determined average power of the received first signal; and wherein it is determined whether the first transmission signal is present in the received first signal based on a comparison of the measure of the average power of the received first signal with the measure of the average power of the received second signal.

* * * * *